(12) United States Patent
Hiranandani et al.

(10) Patent No.: US 10,475,103 B2
(45) Date of Patent: Nov. 12, 2019

(54) METHOD, MEDIUM, AND SYSTEM FOR PRODUCT RECOMMENDATIONS BASED ON AUGMENTED REALITY VIEWPOINTS

(71) Applicant: ADOBE INC., San Jose, CA (US)

(72) Inventors: Gaurush Hiranandani, Karnataka (IN); Sai Varun Reddy Maram, Telangana (IN); Kumar Ayush, Jharkhand (IN); Chinnaobireddy Varsha, Telangana (IN); Siddhant Jain, Karnataka (IN)

(73) Assignee: Adobe Inc., San Jose, CA (US)

( * ) Notice: Subject to any disclaimer, the term of this patent is extended or adjusted under 35 U.S.C. 154(b) by 405 days.

(21) Appl. No.: 15/492,971

(22) Filed: Apr. 20, 2017

(65) Prior Publication Data
US 2018/0121988 A1 May 3, 2018

Related U.S. Application Data

(60) Provisional application No. 62/415,332, filed on Oct. 31, 2016.

(51) Int. Cl.
*G06Q 30/00* (2012.01)
*G06Q 30/06* (2012.01)
(Continued)

(52) U.S. Cl.
CPC ....... *G06Q 30/0631* (2013.01); *G06F 16/583* (2019.01); *G06K 9/6202* (2013.01);
(Continued)

(58) Field of Classification Search
CPC ....... G06Q 30/0631; G06T 7/74; G06T 11/00; G06T 11/60; G06T 2207/20221;
(Continued)

(56) References Cited

U.S. PATENT DOCUMENTS 9,449,342 B2 * 9/2016 Sacco ................... G06T 19/006
2014/0285522 A1 * 9/2014 Kim ...................... G06T 19/006
345/633

OTHER PUBLICATIONS

Inside Houzz: Introducing 'View in My Room' retrieved Apr. 20, 2017 from https://www.houzz.com/deabooks/61877912/list/inside-houzz-introducing-view-in-my-room (Year: 2017).*
(Continued)

*Primary Examiner* — Matthew E Zimmerman
(74) *Attorney, Agent, or Firm* — Brake Hughes Bellermann LLP

(57) ABSTRACT

Provided are methods and techniques for providing a product recommendation to a user using augmented reality. A product recommendation system determines a user viewpoint, the viewpoint including an augmented product positioned in a camera image of the user's surroundings. Based on the viewpoint, the product recommendation system determines the position of the augmented product in the viewpoint and the similarity between the augmented product and other candidate products that are similar to the augmented product. The product recommendation system then creates a set of recommendation images, each recommendation image including an image of the candidate product that is substituted for the augmented product in the viewpoint. The product recommendation system can then evaluate the recommendation images based on overall color compatibility. Based on the evaluation, for example, the product recommendation system selects a recommendation image that is provided to the user.

20 Claims, 11 Drawing Sheets
(4 of 11 Drawing Sheet(s) Filed in Color)

(51) Int. Cl.
  *G06F 16/583* (2019.01)
  *G06T 7/73* (2017.01)
  *G06K 9/62* (2006.01)
  *G06T 11/60* (2006.01)
  *G06T 11/00* (2006.01)
  *G06K 9/00* (2006.01)

(52) U.S. Cl.
  CPC .............. *G06K 9/6215* (2013.01); *G06T 7/74* (2017.01); *G06T 11/00* (2013.01); *G06T 11/60* (2013.01); *G06K 9/00671* (2013.01); *G06T 2207/20221* (2013.01)

(58) Field of Classification Search
  CPC .. G06F 16/583; G06K 9/6202; G06K 9/6215; G06K 9/00671
  See application file for complete search history.

(56) References Cited

OTHER PUBLICATIONS

Inside Houzz: Introducing 'View in My Room' retrieved Apr. 20, 2017 from https://www.houzz.com/deabooks/61877912/list/inside-houzz-introducing-view-in-my-room.

Augmented/Virtual Reality revenue forecast revised to hit $120 billion by 2020 retrieved Apr. 20, 2017 from http://www.digi-capital.com/news/2016/01/augmentedvirtual-reality-revenue-forecast-revised-to-hit-120-billion-by-2020/.

Augmented Reality and Virtual Reality: what's the difference? retrieved Apr. 20, 2017 from https://augmentedstories.com/page/2/.

Augmented and Virtual Reality Devices to Become a $4 Billion-Plus Business in Three Years retrieved Apr. 20, 2017 from http://www.ccsinsight.com/press/company-news/2251-augmented-and-virtual-reality-devices-to-become-a-4-billion-plus-business-in-three-years.

Increasing Conversions with Retargeting Emails and Website Personalization retrieved Apr. 20, 2017 from http://www.barilliance.com/wp-content/uploads/2015/09/Increasing-conversions-with-cart-abandonment-and-website-personalization.pdf.

Weng, Sung-Shun, and Mei-Ju Liu. "Personalized product recommendation in e-commerce." e-Technology, e-Commerce and e-Services, IEEE International Conference on (2004), Mar. 28, 2004 to Mar. 31, 2004 ISBN: 0-7695-2073-1, pp. 413-420, DOI Bookmark: http://doi.ieeecomputersociety.org/10.1109/EEE.2004.1287340 (Abstract Only).

Grbovic, Mihajlo, et al. "E-commerce in Your Inbox: Product Recommendations at Scale." Proceedings of the 21th ACM SIGKDD International Conference on Knowledge Discovery and Data Mining. ACM, 2015.

Naresh Boddeti, Vishnu, Takeo Kanade, and B. V. K. Vijaya Kumar. "Correlation filters for object alignment." Proceedings of the IEEE Conference on Computer Vision and Pattern Recognition. 2013.

\* cited by examiner

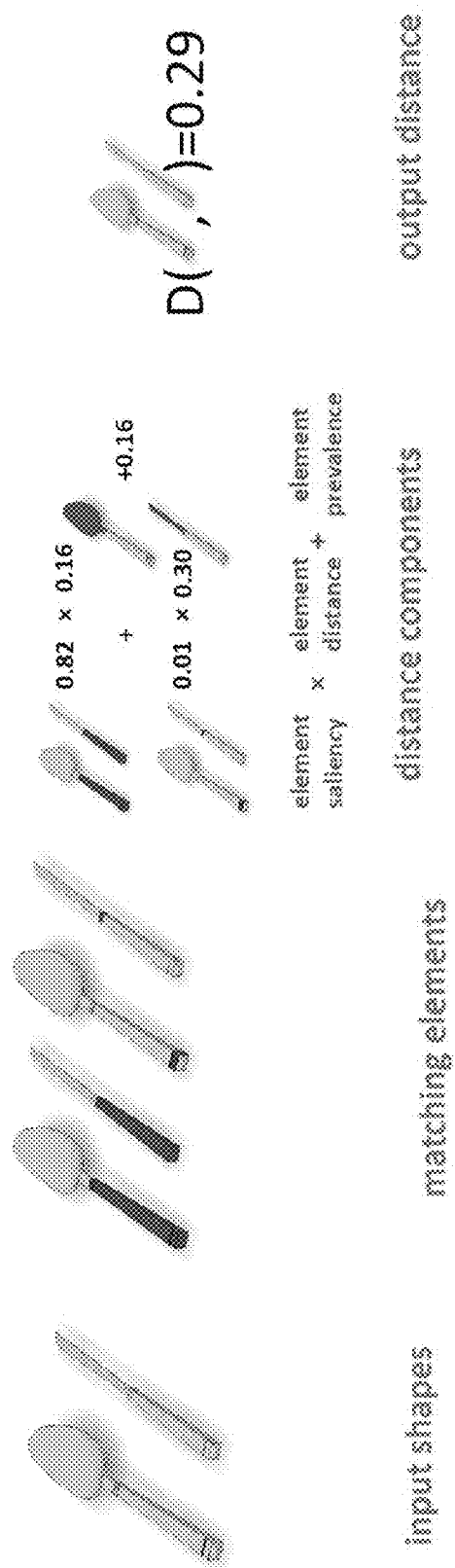

$\sigma$: sigmoid function $t$ : learned penalty parameter

METHOD, MEDIUM, AND SYSTEM FOR PRODUCT RECOMMENDATIONS BASED ON AUGMENTED REALITY VIEWPOINTS

CROSS REFERENCE TO RELATED APPLICATION

This application claims the benefit of U.S. Provisional Application No. 62/415,332, filed Oct. 31, 2016, titled "Product Recommendations Based on Augmented Reality Viewpoints," which is incorporated herein by reference in its entirety.

TECHNICAL FIELD

The present disclosure relates generally to augmented reality, and more particularly to methods and systems for making product recommendations to a user based on augmenting a camera image to include a candidate product image.

BACKGROUND

Many conventional web-based marketing techniques rely on a user's browsing history data to market to a user. For example, as a user shops for products online and/or purchases products, information regarding the browsed and purchased products is recorded and used to provide recommendations and other marketing materials to the user. Companies use the data to send emails, push notifications, and other marketing materials with recommended products to the user. The recommendations are usually based on similarity of meta-tags among products like categories or purchase data from other users.

Web-based marketing techniques often do not adequately identify products to recommend to users because the product recommendations are based on limited information about the users. A user's browser history, for example, provides little or no information regarding the environment in which the user will use a product and how the style and color of a recommended product will fit within that environment. For example, a chair recommended may be recommended to a user based on the user having browsed for chairs. However, the recommended chair may have a color or style that is ill-suited for the environment in which the user intends to use the chair. The chair may not fit well in the intended location or may not fit within the room's color scheme. Existing techniques do not provide users with product recommendations that account for the environment in which the user will use the product.

SUMMARY

Methods and systems for providing a product recommendation using augmented reality are provided herein. A product recommendation system determines a viewpoint of an augmented reality created by a user using a user device. The viewpoint includes a camera image of real objects from the user's surroundings and an image of an augmented product positioned among the real objects. The product recommendation system then determines a style similarity of the augmented product to candidate products. The product recommendation system creates one or more recommendation images using images of at least some of the candidate products. Each recommendation image includes an image of a candidate product embedded in the camera image. Thus, each recommendation image shows the candidate product amongst the real objects from the user's surroundings. The image of the candidate product is the same location and orientation as the augmented product was in the viewpoint. The product recommendation system then selects one or more of the recommendation images to be product recommendations provided the user.

In certain examples, the method further includes evaluating the set of recommendation images based on a color compatibility of the colors within each of the recommendation images. Selection of which recommendations images to provide to the user can additionally or alternatively be based on the color compatibility of the colors within the recommendation images.

These illustrative features are mentioned not to limit or define the disclosure, but to provide examples to aid understanding thereof. Additional embodiments are discussed in the Detailed Description, and further description is provided there.

BRIEF DESCRIPTION OF THE FIGURES

The patent or application file contains at least one drawing executed in color. Copies of this patent or patent application publication with color drawing(s) will be provided by the Office upon request and payment of the necessary fee. The features, embodiments, and advantages of the present disclosure are better understood when the following Detailed Description is read with reference to the accompanying drawings.

FIG. 9A is an illustration depicting a method to determine the dissimilarity between two shapes using component element similarity and prevalence, in accordance with certain example embodiments.

DETAILED DESCRIPTION

Overview

Figure 1A:
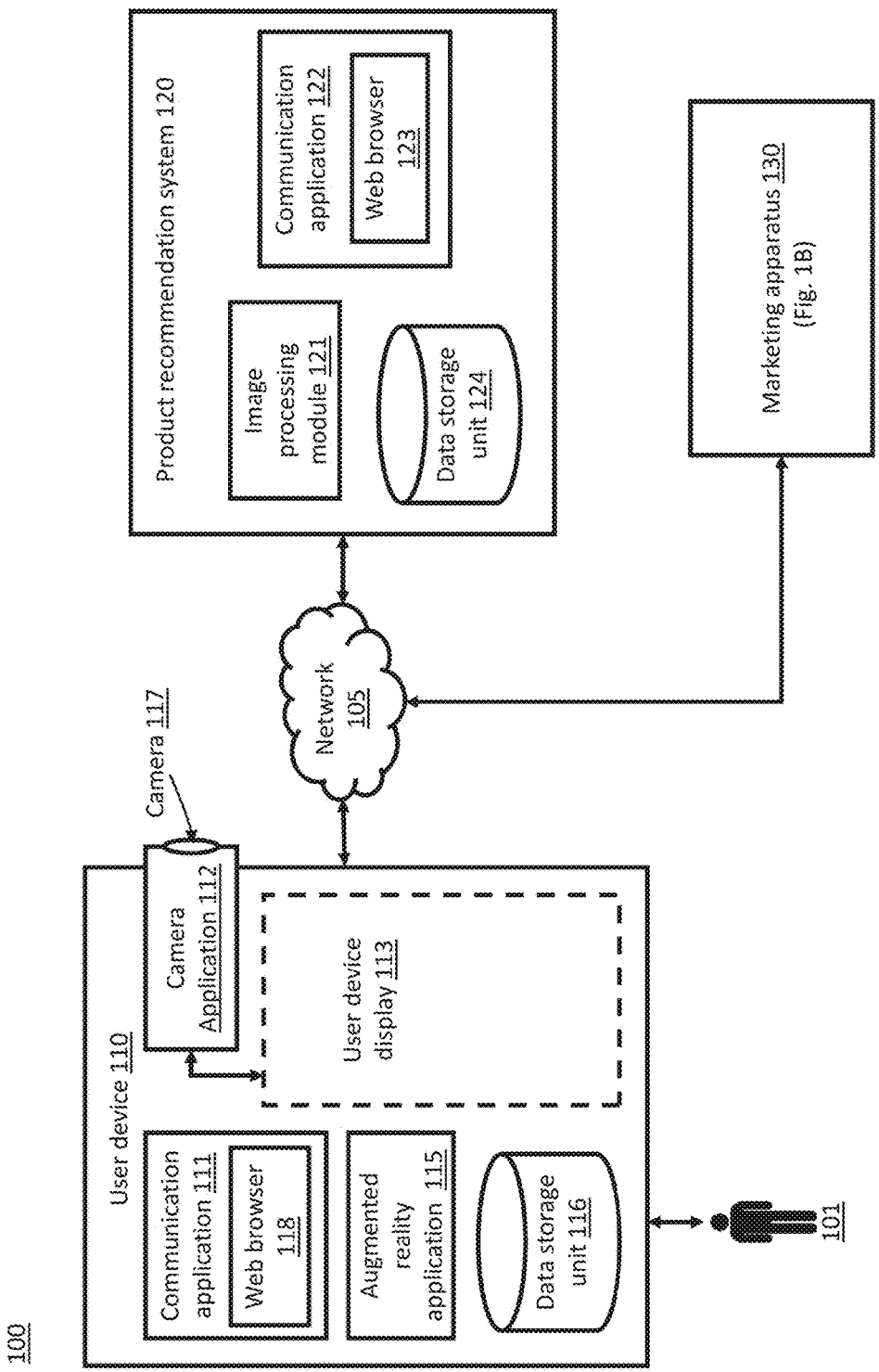
FIG. 1A is a block diagram of a computer network environment and system for providing a product recommendation to a user using augmented reality, in accordance with certain example embodiments.

As described herein, provided are techniques for providing a product recommendation to a user using augmented reality. For example, a product recommendation system determines a viewpoint of an augmented reality created by a user. The viewpoint includes an image of an augmented product positioned in a camera image of the user's surroundings. Based on the viewpoint, the product recommendation system determines the position of the augmented product in the viewpoint. The product recommendation system also determines similarities between the augmented product and one or more candidate products that the product recommendation system could recommend to the user. Based on the similarities, the product recommendation system creates a set of recommendation images that can be provided to the user as a product recommendation. The recommendation images include, for example, a candidate product image of a candidate product, the candidate product image being substituted for the augmented product in the recommendation image. In certain examples, before providing a product recommendation image to a user, the product recommendation system evaluates the recommendation images based on overall color compatibility of the colors within each image. Based on the evaluation, the product recommendation system then selects a recommendation images that is provided to the user.

In one example, a user selects an augmented product for viewing in an augmented reality application on the user's user device. Using a camera application on the user device, the user then views, on a display of the user device, the area of the user's surroundings in which the user desires to place the augmented product. The user then places the augmented product within the camera image display of the user device, thus allowing the user to view an image of the augmented product in the user device display of the user device. Hence, the user can view, on the display of the user device, the augmented product positioned among real objects in the user's surroundings as captured in the camera image on the display of the user device.

Once the user can view the augmented product on in the camera image of the display on the user device, the user then provides input to position the augmented product in the camera image in various locations. The system identifies a desired location of the augmented product based on the user's interactions with the object. For example, the product recommendation system distinguishes temporary positions of the product from a desired location of the product based on the user interactions. As a specific example, when the user stops moving the product in the camera image for more than a threshold amount of time, such that the product remains in a location for more than the threshold amount of time, the product recommendation system can identify that location as a desired product location. When a desired product location is detected, the product recommendation system captures a viewpoint. For example, the product recommendation system captures a screen shot of the display on the user device when the user has completed the process of positioning the image of the augmented product within the display image provided by the camera. The screenshot then serves as the viewpoint.

In certain examples, the product recommendation system captures the viewpoint when the user spends a threshold amount of time without moving or re-orientating the augmented product within the camera image. For example, if the user spends more than about 1 second with the image of the augmented product in the same location of the camera image, then the product recommendation system determines that the viewpoint corresponds to the displayed image during the once second timeframe. The product recommendation system then captures the viewpoint.

After the product recommendation system captures the viewpoint, the product recommendation system determines the position of the augmented product within the viewpoint. In certain examples, the product recommendation system uses correlation filters to determine the orientation of the augmented product in the viewpoint. For example, the product recommendation system may use a set of training images that contain images of real objects similar to the augmented product, with each of the real object images positioned in multiple different ways. Correlation filters determined based on this training information are then used to determine the position of the augmented product within the viewpoint. Alternatively, the product recommendation system may capture the location and orientation of the augmented product in the viewpoint based on information tracked by the augmented reality application. In one example, the augmented reality application tracks the location, rotation, and scale of the augmented throughout the user's augmented reality session. The product recommendation system receives the location, rotation, and scale for the viewpoint. This information is used as the position and orientation of the augmented product in the viewpoint.

In addition to determining the position of the augmented product in the viewpoint, the product recommendation system determines the style of the augmented product as compared to other candidate products. For example, the product recommendation system compares the three-dimensional features of the augmented product to a candidate product to determine a style similarity between the augmented product and candidate product that the product recommendation system may recommend to the user. If the augmented product is a chair with arms, legs, and an arched back, a candidate product with the same attributes would have a higher similarity than a candidate product of a chair with no arms and a flat back. In certain examples, the product recommendation system computes a distance measure that quantifies the style dissimilarity between the candidate product and the augmented product. For example, matching elements on the pair of products are analyzed, along with prevalence of the elements. Based on the style and prevalence analysis, the product recommendation system generates a score, such as a style similarity score. The higher the style similarity score, for example, the more similar the augmented product and the candidate product.

Based on the similarity of the augmented product to the candidate product, the product recommendation system creates a set of recommendation images. For example, for a given candidate product that surpasses a threshold value of style similarity with the augmented product, the product recommendation system replaces the image of the augmented product with the candidate product image of the candidate product in the viewpoint. Stated differently, the product recommendation system adds the candidate product image to the camera image in the same location and orientation where the user placed the augmented product in the viewpoint. Each recommendation image thus includes a candidate product embedded within the real objects of the camera image. In certain examples, the recommendation images are normalized such that they have the same reference in terms of the rotation, translation, and scale. In certain examples, the recommendation image with the highest similarity score is provided to the user as a product recommendation. For example, the product recommendation system can provide the user the highest ranked recommendation image (or group of images), thereby recommending a specific product to the user that fits within the surroundings in which the user will use the product and that is similar to the augmented product that the user selected.

After creation of the recommendation images, in certain examples, the product recommendation system determines the color compatibility of the recommendation images. For example, the product recommendation system determines the color scheme within each recommendation image, such as a set of dominant colors that may attract the attention of a user. The product recommendation system then compares the color scheme to known color-compatibility color schemes. In certain examples, the product recommendation system determines a color score for the color compatibility determination based on the comparison. For example, a recommendation image with a higher color score may have better overall color compatibility as compared to a recommendation image with a lesser color score.

In certain examples, the product recommendation system uses both the color score and the similarity score to determine an overall score for the recommendation images. In one example, the product recommendation system weighs the style similarity score and the color score, thereafter combing the scores to determine the overall score. In certain examples, the weights in the overall score are based at least in part on survey data in which survey participants provide opinions regarding the recommendation images. The overall score is then used, for example, to select one or more of the recommendation images to provide to the user. For example, if there are sixty recommendation images, the five with the top overall score may be provided to the user. In certain examples, the selected recommendation images are provided to the user in a catalog, such as a product recommendation catalog.

As those skilled in the art will appreciate, the techniques described herein provide numerous advantages over conventional product recommendation systems. Unlike conventional web-based recommendations that rely on user browser data, for example, the techniques provided herein provide product recommendations for products that are highly similar to the product the user is known to be interested in for use in a particular environment. The products recommended are selected based on information about user's product interest, such as the size, shape, and other style attributes of a chair, and/or information about the user's surroundings, such as the color of the flooring, walls, and other furniture that will surround the recommended product in the environment in which the user will use the product. Conventional web-based recommendations do not take in to account how the recommended product actually fits in the user's surroundings and do not recommend products using images of the actual environments in which the recommended products will be used by the user. These advantages and others also increase the likelihood that the user will purchase a product that is presented to the user.

General Terminology

As used herein, the phrase "augmented reality" refers to technology that superimposes a computer-generated image on a user's view of the real world, thus providing a composite view to the user. For example, an image of an augmented product may be superimposed on the user's view of the real world, such as in a camera image captured by the camera on a user's mobile phone or other user device. An "augmented object" refers generally to the computer-generated image that is superimposed on the user's view of the real world.

As used herein, the phrase "camera image" refers the image captured by the camera of a user device, such as when the user opens a camera application on the user device and videos the user's surroundings. The view on the display screen of the user device provides the user with the camera image. The user can move the user device, for example, thereby changing the camera image that is displayed on the user device. The camera image includes, for example, a view of the real objects in the user's surroundings, the view being displayed on a display of a user device.

As used herein, the phrase "augmented product" refers to a product that is or can be superimposed on and/or integrated into a camera image using augmented reality. The augmented product, for example, can be a digitized image of an actual product or other rendering of an actual product. In certain examples, the augmented product can have three-dimensional properties and hence be viewed and analyzed as a three-dimensional augmented object. An image of the augmented product can be viewed, for example, on the display screen of the user device when the user utilizes a camera application on the user device to generate a camera image and place the image of the augmented product in the camera image. Hence, the image of the augmented product appears on the display of a user device as an augmented object, and can be positioned in the display relative to the real objects in the user's surroundings that are also presented to the user on the display of the user device.

As used herein, the term "viewpoint" refers to the composite image that is generated when an image of an augmented product is superimposed on the camera image of a user device at a particular time. A viewpoint can be determined, for example, by detecting that the user interactions indicate that the user has finished positioning an augmented product in a desired location within real objects in the user's surroundings as viewed in the camera image. For example, the viewpoint can be determined when the user stops moving the augmented product for more than a threshold amount of time.

As used herein, the phrase "real objects" refer to actual, tangible items that are present in a user's surroundings/environment. Real objects include, for example, tables, desks, chairs, lamps, flooring, painted walls, wall hangings, rugs, electronic devices, etc., i.e., anything that is typically in a room of a user. The real objects can also be outdoors, such as on a patio or in a user's garden. For example, the real objects may be outdoor chairs, benches, tables, yard sculptures, landscaping, trees, streams, lakes, etc., i.e., anything that is typically found outside a user's home or office. The real objects, for example, appear on the display of a user's user device when the user utilizes the device's camera to view the real objects.

As used herein, the phrase "candidate product" refers to a product that is different than an augmented product but is nevertheless a product that the user may be interested in obtaining. For example, if the augmented product is a user-selected chair, the candidate product can be a similar chair. The candidate product, for example, can be a digital model of an actual product or other rendering of an actual product. In certain examples, the candidate product has three-dimensional features and hence can be manipulated, such as by rotating the candidate product and/or moving the candidate product so as to compare to the candidate product to the augmented product so as to determine the similarity between the candidate product and the augmented product as described herein.

As used herein, the phrase "candidate product image" refers to a digital image of a candidate product. The candidate product image can, for example, be inserted as an augmented product in to a camera image. For example, if a user is interested in a chair and selects a chair as an augmented product, a candidate product image would be one or more images of chairs that are different from the user-selected chair but still similar to the user-selected chair. In certain examples, the chair may be the same chair that the user selected, except in a different color that is more soothing based on the color patterns, hues, and tones present in the camera image. Candidate product images, for example, can be stored in an image repository and hence can be selected for inclusion in a recommendation image as described herein.

As used herein, the phrase "recommendation image" refers to a camera image from a user that includes a candidate product image. The recommendation image is, for example, based on the viewpoint of the user, and hence includes real objects in the camera image present from the user's surroundings. In the recommendation image, the candidate product image is placed in the same or similar location and orientation of a user-selected augmented product that was present in the viewpoint.

As used herein, the phrase "style similarity" refers to a measure of the likeness between two products, such as likeness of product shape, pattern, or features. Style similarity of products can be measured using various techniques. Style similarity can be determined quantitatively, for example, such as by using style similarity metrics of three-dimensional products. For example, style similarity between two products can be determined based on the level of matching between the products and the prevalence of the similar areas. Style similarity can be assessed using machine learning techniques trained based on a training set of images of similar objects. Such techniques generally identify similarity of features in three-dimensional models of the two products and determine how similar the two products are based on the amount of matching features in the two products.

As used herein, the phrase "color compatibility" refers to a measure of how well colors in a color scheme go together. Color compatibility can be measured using various techniques. Color compatibility can be determined quantitatively, such as by sampling the colors in a recommendation image and comparing the sampled colors to known color compatibility schemes. One exemplary technique determines a set of harmonious color schemes by receiving rankings or other evaluations of color schemes from multiple users and identifying the color schemes with the highest average rankings or evaluations. The color compatibility of other color schemes is then determined by determining how similar the other color schemes are to the known harmonious color schemes. If a color scheme has colors similar to a harmonious color scheme, the color scheme is given a relatively high color compatibility scores. If a color scheme has colors that are not similar to any of the harmonious color schemes, the color scheme is given a relatively low color compatibility scores. In one example, a color scheme of a recommendation image is determined to contain colors that are harmonious.

Example System Architecture

Turning now to the drawings, in which like numerals indicate like (but not necessarily identical) elements throughout the figures, example embodiments are described in detail.

FIG. 1A is a block diagram of a computer network environment and system for providing a product recommendation to a user using augmented reality, in accordance with certain example embodiments.

As depicted in FIG. 1A, the exemplary operating environment 100 includes a user device 110, a product recommendation system 120 ("product recommendation system"), and a marketing apparatus 130 that are configured to interact with each other over the network 105.

The network 105 includes a wired or wireless telecommunication means by which network devices 110, 120, and 130 interact. For example, the network 105 can include a local area network ("LAN"), a wide area network ("WAN"), an intranet, an Internet, storage area network ("SAN"), personal area network ("PAN"), a metropolitan area network ("MAN"), a wireless local area network ("WLAN"), a virtual private network ("VPN"), a cellular or other mobile communication network, Bluetooth, Bluetooth low energy, near field communication ("NFC"), Wi-Fi, or any combination thereof or any other appropriate architecture or system that facilitates the communication of signals, data, and/or messages.

Each network device 110, 120, and 130 includes a device having a communication module (not shown) capable of transmitting and receiving data over the network 105. For example, each network device 110, 120, and 130 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1A, the network devices 110, 120, and 130 are operated by end-users or consumers, recommendation system operators, and marketing operators, respectively, or other end user operators.

The user device 110, for example, can include a communication application 111 and associated web browser 118 that can interact with web servers or other computing devices connected to the network 105. For example, the user 101 can use the communication application 111 of the user device 110, such as a web browser 118 application or a stand-alone application, to view, download, upload, or otherwise access documents, web pages, or digital images via a distributed network 105. For example, the user 101 may use the communication application 111 and web browser 118 to identify images of products on the internet that the user wishes to use, such as in conjunction with the augmented reality application 115, to augment a camera image displayed on the user device display 113 of the user device 110 with the product.

As shown, the user device also includes a camera application 112 that is configured to interact with a camera 117 of the user device 110 and a user device display 113 of the user device 110. The camera application, for example, represents the software and or/other components of the user device 110 that run and operate a camera 117 associated with the user device 110. For example, a user 101 may click or otherwise select a user control option on the user device 110 that accesses the camera 117. Using the camera application 112, the user 101 can, for example, zoom in, zoom out, and perform other features typically associated with using a camera 117 on a user device 110. The camera application 112, for example, is also connected to a user device display 113, which represents the video screen on which the user views the output of the camera 117 as processed by the camera application 112. For example, if the user 101 points the camera of the user device 110 at a chair, the chair and its surrounds are visible to the user as an image in the user device display 113.

The user device 110 also includes an augmented reality application 115. The augmented reality application 115 ("AR application") represents the component of the user device 110 that, in certain example embodiments, allows a user 101 to augment a camera image on the user device display 113 with an augmented object. For example, if the user 101 selects an image of a product from the internet using the communication application 111, the AR application 115 allows the user 101 to insert the product in the camera image of the display 113 so that the user 101 can view the augmented object on the user device display 113 as an augmented product. Hence, the AR application is configured to interact with the camera 117, the camera application 112, and the camera image display 113 of the user device 110 so as to generate an augmented reality image (including the augmented product).

In certain example embodiments, the user device 110 may include a data storage unit 116 for use in storing retrievable information, such as product images that the user 101 has collected with use with the AR application 115. For example, the user 101 may use the data storage unit to store product images of products that the user 101 may be interested in purchasing. The user 101 can then use the AR application 115, for example, to later retrieve a product image and superimpose the product image as an augmented object on a camera image generated via the camera 117, the camera application 112, and the camera image display 113. The example data storage unit 116 can include one or more tangible computer-readable media, and can be either stored on the user device 110 or logically coupled to the user device 110. The data storage unit 116 can include on-board flash memory and/or one or more removable memory cards or removable flash memory. As those skilled in the art will appreciate, other customary electronic components (not shown) may be associated with the user device.

The product recommendation system 120 represents the component of the exemplary operating system 100 responsible for determining a user viewpoint of an augmented reality image, determining the position of an augmented product in the camera image, creating and evaluating recommendation images, and providing recommendation images (and hence product recommendations) to the user 101. The product recommendation system 120 includes, for example, an image processing module 121 that performs the analytical functions of the product recommendation system 120. For example, the image processing module 121 reviews augmented image and/or data received from the user device 110 to determine the time instant for selecting the viewpoint. The image processing module 121 also processes the received imaged and/or data to create and evaluate the recommendation images, as described herein.

As shown, the product recommendation system 120 also includes a communication application 122 and associated web browser 123. The communication application 122, for example, allows a system operator, such as a product recommendation system 120 operator, to interact with the product recommendation system 120. For example, the system operator may use the web browser 123 to identify and create a repository of candidate products, such as by searching the web or using a web crawler to identify candidate products that can be used in accordance with the methods and systems described herein. The repository of candidate products, for example, can be stored on a data storage unit 124 of the product recommendation system 120. The data storage unit 124, for example, can also store recommendation images that can be retrieved, such as by the image processing module 121, and used to create a product recommendation as described herein. The example data storage unit 124 can include one or more tangible computer-readable media, and can be either stored on the product recommendation system 120 or logically coupled to the product recommendation system 120. The data storage unit 124 can include on-board flash memory and/or one or more removable memory cards or removable flash memory.

As those skilled in the art having the benefit of this disclosure will appreciate, all of the functions of the product recommendation system 120 described can, in certain example embodiments, be performed on the user device 110, such as in conjunction with (or as an integrated part of) the AR application. In certain other example embodiments, one or more of the functions of the product recommendation system 120 can be performed separately and independently from the user device 110. For example, the product recommendation system 120 can receive augmented reality images and/or data from the user device 110, such as from the AR application 115 and the communication module (not shown) via the network 105. The product recommendation system 120 then processes the received images and/or data as described herein and then, for example, returns a product recommendation to the user 101 over the network 105 and via the user device 110. In another example, the determination of the viewpoint as described herein can occur via the AR application 115, the product recommendation system 120, or a combination thereof.

In addition to the components described herein, the exemplary operating environment 100 can include an optional marketing apparatus 130. The marketing apparatus 130, for example, is responsible for providing marketing information to a user 101, such a compiling a catalog of recommendation images or other advertising material including one or more recommendation images that are provided to a user 101. The product recommendation system 120 can also be implemented as part of the marketing apparatus 120. The details of marketing apparatus 130 are described in FIG. 1B.

Figure 1B:
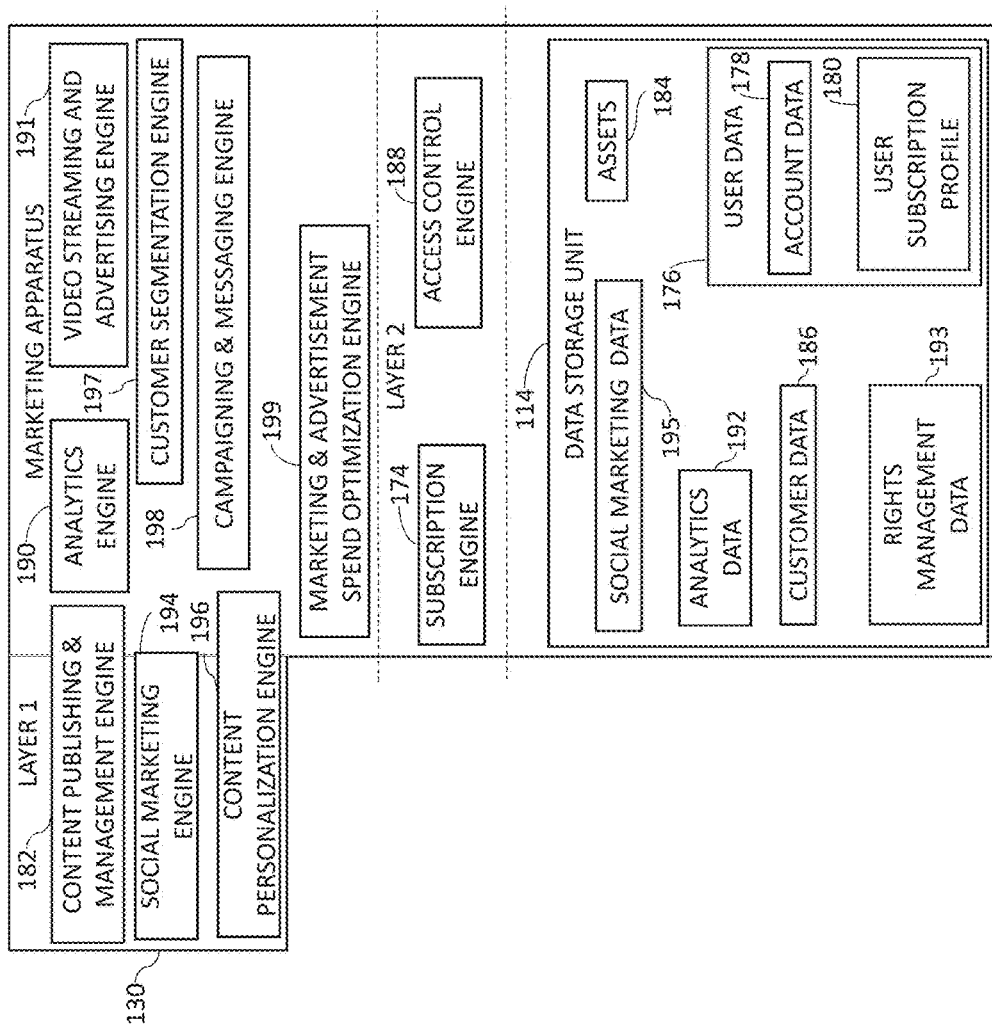
FIG. 1B is a block diagram of a marketing apparatus for use in conjunction with the methods and systems described herein, in accordance with certain example embodiments.

FIG. 1B is a block diagram of a marketing apparatus 130 for use in conjunction with the methods and systems described herein, in accordance with certain example embodiments. As shown, the optional marketing apparatus 130 includes one or more engines for providing one or more digital experiences to the user 101. The marketing apparatus 130 can be implemented using one or more servers, one or more platforms with corresponding application programming interfaces, cloud infrastructure and the like. In addition, each engine can also be implemented using one or more servers, one or more platforms with corresponding application programming interfaces, cloud infrastructure and the like. The marketing apparatus 130 also includes a data storage unit 114. The data storage unit 114, liked the data storage units 116 and 124 (FIG. 1A), can be implemented as one or more databases or one or more data servers. The data storage unit 114 includes data that is used by the engines of the marketing apparatus 130.

In one embodiment, the marketing apparatus 130 can be divided into two layers of engines, i.e., Layer 1 including core engines that provide workflows to the user 101 and Layer 2 including shared engines that are shared among the core engines. Any core engine can call any of the shared engine for execution of corresponding task. In another embodiment, the marketing apparatus does not have layers and each core engine can have an instance of the shared engines. In either embodiment, each core engine can access the data storage unit 114 directly or through the shared engines.

The user 101 of a user device (not shown) visits a webpage or an application store to explore applications supported by the marketing apparatus 130. The marketing apparatus 130 provides the applications as a software as a service (SaaS), or as a standalone application that can be installed on the user device, or as a combination. The user 101 creates an account with the marketing apparatus 130 by providing user details and also by creating login details. Alternatively, the marketing apparatus 130 can automatically create login details for the user 101 in response to receipt of the user details. The user 101 can also contact the entity offering the services of the marketing apparatus 130 and can get the account created through the entity. The user details are received by a subscription engine 174 and stored as user data 176 in the data storage unit 114. In some embodiments, the user data 114 further includes account data 178 under which the user details are stored.

The user 101 can opt for subscription of one or more engines of the marketing apparatus 130. Based on subscription details of the user 101, a user subscription profile 180 is generated by the subscription engine 174 and stored. The user 101 subscription profile 180 is stored in the data storage unit 114 and indicates entitlement of the user 101 to various products or services. The user 101 subscription profile 180 also indicates type of subscription, i.e. premium subscription or regular subscription.

The marketing apparatus 130 includes a content publishing and management engine 182 that enables the user 101 to create websites and other content. The content publishing and management engine 182 provides an end to end workflow to the user 101 right from creation of content, to hosting of content, to publishing of content, and finally, to management, i.e. editing and republishing, of content. The content publishing and management 182 further includes one or more engines (not shown in FIG. 1B), such as asset management engine, website management engine, mobile content management engine, form management engine, search engine and community management engine to enable one or more workflows. The user 101 can create content, such as forms, mobile application or webpage content, using the content publishing and management 182. The user 101 can either do the creation or can send it for creation to third party via workflows provided through the content publishing and management engine 182. The user 101 then publishes the content and manages it through the content publishing and management engine 182. The user 101 can also create communities or forums for discussions with customers and manage the communities through the content publishing and management engine 182. The content publishing and management engine 182 also provides asset management capabilities including asset searching using various tags and metadata. The content publishing and management engine 182 stores assets 184 in the data storage unit 114. Examples of the assets 182 include, but are not limited to, image, text, document, video, audio, font, and metadata. In addition, the content publishing and management engine 182 enables multisite, i.e. multiple websites and mobile content, management workflows, and commerce, i.e., personalized shopping experiences that incorporate video, social, and other dynamic media, related workflows. For some of the functionalities, such as asset management, the content publishing and management engine 182 can work in conjunction with the creative apparatus 108 and access data from the data storage unit 112.

Each engine of the marketing apparatus 130 also stores customer data 186 for the user 101 in the data storage unit 114. The user 101 or the entity of the user 101 can have one or more customers, including potential customers, and hence, the one or more engines of the marketing apparatus 130 store the customer data 186. The customer data 186 can be shared across these engines or can be specific to each engine. In some embodiments, the access data 184 is a part of the customer data 186. The access to the customer data 186 is controlled by an access control engine 188 which can be shared across the engines of the marketing apparatus 130 or each engine can have one instance of the access control engine 188. The access control engine 188 determines if the user 101 has access to a particular customer data 186 based on the subscription of the user 101 and access rights of the user 101.

The marketing apparatus 130 also includes an analytics engine 190. The user 101 can enable tracking of the content while creating the content or at any other point. Various methods of tracking can be used. For example, tracking code can be embedded into the content for tracking and sending tracked data to the analytics engine 190. The analytics engine 190 tracks the data and stores tracked data as analytics data 192. The analytics engine 190 tracks the data and performs meaningful processing of the analytics data 192 to provide various reports to the user 101. In addition, in one embodiment, the analytics engine 190 also acts as a shared engine and is accessible by other engines to obtain meaningful analysis on basis of which other engines can offer various functionalities to the user 101. In another embodiment, each engine can have an instance of the analytics engine 190 which is customized according to need of that engine. The analytics engine 190 is used for tracking all types of content, such as mobile application, video, image, website, document, advertisement, and also for tracking the assets 184. The analytics engine 190 also supports predictive intelligence to provide predictions based on the analytics data 192. The analytics engine 190 also stitches information tracked from various sources where the content is consumed and provides a holistic view, i.e., 360 degrees' view of the analytics data 192.

The marketing apparatus 130 also includes a social marketing engine 194 for providing social marketing related workflows. The social marketing engine 194 allows the user 101 to share the content on social networks, and then manage the content sharing and associated information, such as posts and comments. For example, the social marketing engine 194 provides recommendations to the user 101 to determine when to post which content and to determine how audience will react to the post, helps the user 101 to respond to queries from viewers of post, and performs other managing related to the post. In addition to the social networks, the social marketing engine 194 also provides workflows to manage content on blog, and other communities. The social marketing engine 194 provides recommendations by tracking the data on social networks and storing the data as social marketing data 195. The social marketing data 195 is then processed by the social marketing engine 194 to determine recommendations. The social marketing engine 194 can automate many manual workflows. For example, the social marketing engine 194 can perform automatic posting of the post at an appropriate time, automatically respond to queries from post viewers and the like. The social marketing engine 194 uses the analytics engine 190 for tracking data on social networks or can source data from the social networks. The social marketing engine 194 can also be a shared engine which can be accessed by various engines of the marketing apparatus 130. Alternatively, the engines can have an instance of the social marketing engine 194 and can directly access the social marketing data 195.

The marketing apparatus 130 also includes a content personalization engine 196. The content personalization engine 196 enables the user 101 to provide different digital experiences to the customers when different customers visit same webpage or same application of the user 101. The content personalization engine 196 provides various workflows to the user 101 to create different versions of the webpage or the application or the content and to perform A/B testing. Based on the testing, the user 101 may choose to provide different personalization for different sets of customers. The content personalization engine 196 also uses the customer data 186 which can be part of the analytics data 192, in one embodiment, or can be stored separately in another embodiment. The customer data 186 includes customer profiles. The customers, as described herein, also includes mere visitors which are not customers yet. A profile includes one or more attributes of a customer. An attribute, as described herein, is a concept using which the customer can be segmented. Examples of the attribute include, but are not limited to, geographical location, age, gender, purchase capacity, language, habits, browsing trends, or any other attribute using which the customers can be segmented. The customer data 186 is generated by a customer segmentation engine 197 by collecting data from different sources including electronic sources, such as the analytics engine 190, online forms, customer submitting data online, and other online sources, and non-electronic sources including paper forms and other offline sources. The customer data 186 can be shared between users and some of the customer data 186 can be specific to each user and not accessible by other users. The customer segments are used by the content personalization engine 196 to personalize content and show relevant content to the customers. In addition, the content personalization engine provides automated workflows to enable the personalization including providing recommendations for the content that should be shown to a particular customer segment.

The marketing apparatus 130 also includes a campaigning and messaging engine 198 that enables workflows for the user 101 to perform marketing campaigns including sending marketing emails. The campaigning and messaging engine 198 uses the customer data 186 and generates customer segments for performing marketing campaigns. Alternatively, the campaigning and messaging engine 198 uses customer segmentation engine 197 for generating customer segments. A marketing campaign, as defined herein, includes sending marketing messages to customers. The messages can be sent as electronic mails, mobile messages, push to text, social networks, advertisements, or as any other type of message. The campaigning and messaging engine 198 customizes the messages before the messages are send out. For customization, the campaigning and messaging engine 198 provides automated workflows to the user 101. The user 101 can specify attributes for customer segmentation and the campaigning and messaging engine 198 automatically picks the customers to whom the message is to be sent and also personalizes the message based on the attributes of the customer segment. The campaigning and messaging engine 198 also provides A/B testing option to the user 101 to test which message to send out of two messages. The campaigning and messaging engine 198 also stores different customer segments for each user 101 in the customer data 186. In addition, the content used for creating personalized messages, email identifiers and other data is stored as part of the customer data 186 which can be specific for the user 101 and inaccessible to other users.

The marketing apparatus 130 also includes marketing and advertisement spend optimization engine 199. The marketing and advertisement spend optimization engine 199 helps the user 101 in budget management for running marketing campaigns, showing advertisements on websites, as search results, social advertisements, and other form of advertising. The marketing and advertisement spend optimization engine 199 tracks budget spend of the user 101 and the budget remaining, and based on that performs analysis to recommend advertising channels for maximizing benefit. In addition, the marketing and advertisement spend optimization engine 199 uses the customer data 186 and the analytics data 192, and stitches that data to generate the recommendation. The analytics data 192 includes information on how the marketing content performed. The customer data 186 further indicates what type of customers visited the marketing content and the analytics data 192 further indicates who all among those customers ended up in performing a transaction.

In various embodiments, the customer data 186 also includes data regarding devices used by the customers. The device data is used for stitching customer data. For example, a customer 1 may use device 1 to visit website A. The customer 1 may use device 2 to visit website B. The website A and the website B may belong to the same user. So, instead of considering customer 1 as two different customers the data including at least one common identifier such as email id helps the user 101 to identify that the two different visits were made by the same customer 1. Also, by doing analysis on the customer data 186 and the analytics data 192, richer customer profiles or segments can be generated. Also, devices that correspond to the same customer can be identified resulting in providing more targeted digital experience to the customer and making benefit for the user 101.

The marketing apparatus 130 also includes a video streaming and advertising engine 191 that helps the user 101, such as broadcasters, cable networks and service providers create and monetize engaging and personalized viewing experiences. The video streaming and advertising engine 191 can be implemented to provide a software development kit to the user 101 to build and deliver videos to the customers. In addition, the video streaming and advertising engine 191 provides workflows to the user 101 to insert advertisement within the videos and provides recommendations to the user 101 for locations for advertisement insertion. The recommendations are generated using the analytics data 192 which includes information regarding what portions of video was viewed most and other video analytics data, and also using the customer data 186 which includes customer segments who viewed the video and corresponding advertisement. The video streaming and advertising engine 191 also stores rights management data 193 for different videos for the customers of the user 101. For example, if a video is paid then the video streaming and advertising engine 191 does not provide access to the customer based on the rights management data 193. Using the rights management data 193, the video streaming and advertising engine 191 protects content rights across various devices of the customers. Also, the video streaming and advertising engine 191 includes an authentication engine for authenticating the customers. The customer authentication data can also be stored as part of the customer data 186. The customer authentication data includes login details or other identifiers for the customer.

As those skilled in the art will appreciate, the network connections shown in FIGS. 1A and 1B are examples only, inasmuch as other means of establishing a communications link between the computers and devices can be used. Further, the devices/systems 110, 120, 130 and their components can have any of several other suitable computer system configurations. In certain example embodiments, one or more of the several components presented herein may be any type of computing device, including for example those discussed in more detail with respect to FIG. 6. Likewise, any modules or applications discussed herein or any other modules (scripts, web content, software, firmware, or hardware) may be performed or accomplished by any modules or application detailed in FIG. 6.

Example Processes

The components of the example operating environment 100 are described hereinafter with reference to the example methods and diagrams illustrated in FIGS. 2-4. The example methods of FIGS. 2-4 may also be performed with other systems and in other environments.

Figure 2:
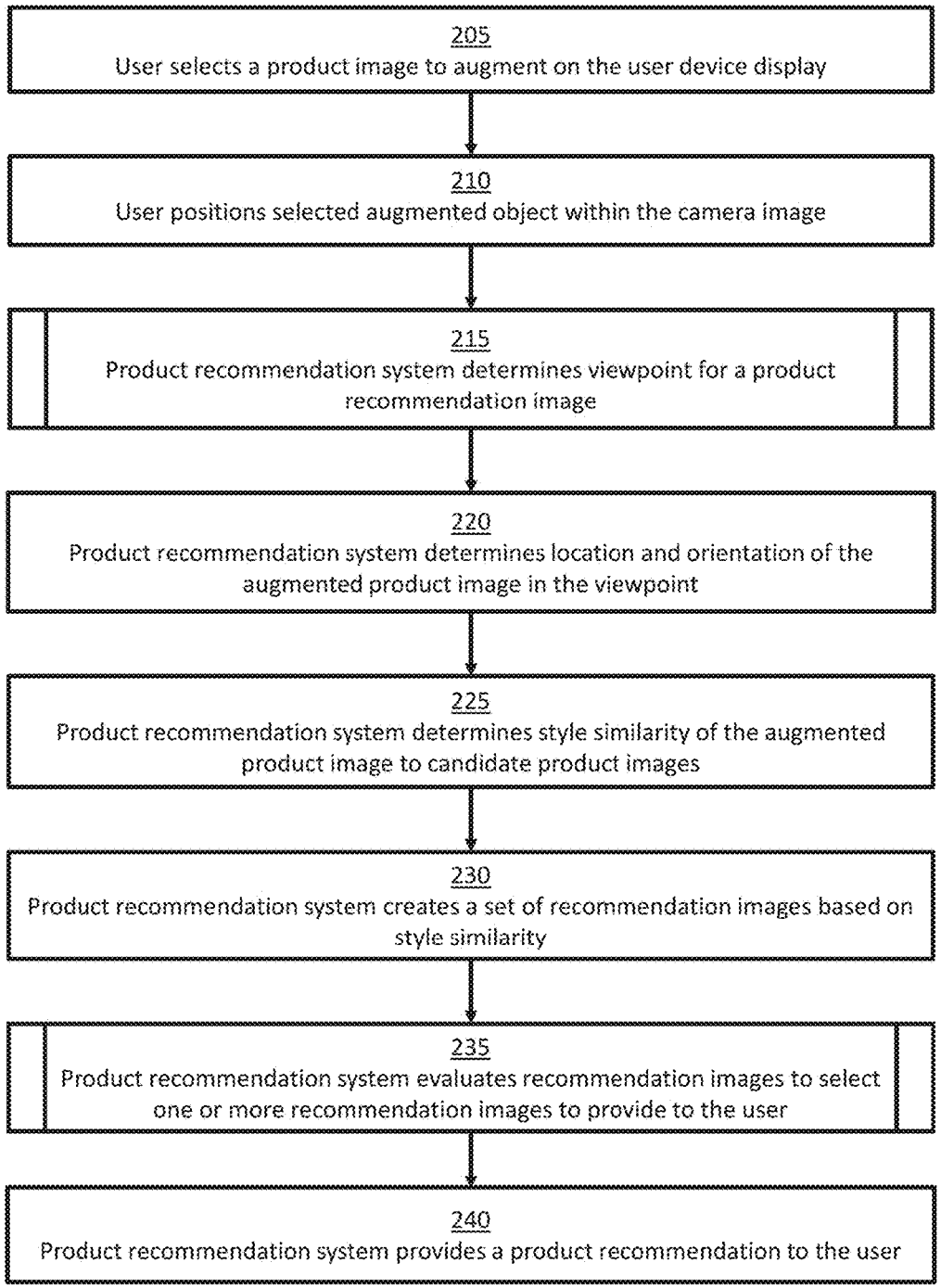
FIG. 2 is a block flow diagram depicting a method for providing a product recommendation to a user using augmented reality, in accordance with certain example embodiments.

FIG. 2 is a block flow diagram depicting a method for providing a product recommendation to a user 101 using augmented reality, in accordance with certain example embodiments.

With reference to FIGS. 1A-1B and 2, in block 205 of FIG. 2, a user 101 selects a product to augment on the user device 110. That is, the user chooses a product image, the product image including a product that the user 101 desires to view an augmented reality image. The user 101 then uses the AR application 115, for example, along with the camera 117 and camera application 112, to insert the product image into the camera image, thus generating an augmented product in the camera image. For example, the user 101 selects a product from a digital product catalog. The product can be any product that a user may be interested in, such as a chair, desk, lamp, or other object, that the user 101 intends to place in his or her surroundings. The user then selects the product image of the product and uses the AR application 115, for example, to insert the product image into the camera image. Hence, the resultant augmented reality image includes the augmented product (i.e., the product image the user selected) superimposed on and/or within the camera image generated via the camera 117 and camera image application 112 on the camera image display.

In certain example embodiments, the user 101 may scan or photograph an image of the product, such as from a paper catalog. In certain other example embodiments, the user 101 may select a digital photograph, such as a photograph of a product stored in a photo library on the data storage unit 116 of the user device 110. For example, the user 101 may take a photograph of a chair that the user is interested in purchasing but for which the user 101 has concerns about how the chair will look in the user's office. The image is then used in the AR application. In one example, the AR application is automatically launched with the image used to generate an augmented reality image. In another example, the user 101 retrieves the product image from the photo library, and thereafter uses the product image with the AR application 115 to generate an augmented reality image—including the photograph as an augmented product—on the user device display 113 of the user device 110.

In block 210, the user 101 positions the augmented product within the camera image. That is, after the user 101 selects a product to augment on the user device 110, the user 101 utilizes the AR application 115—along with the camera 117 and camera application 112—to move the augmented product around within the camera image. For example, after the augmented product is inserted in the camera image, the user 101 can move the user device 110 so as to position the augmented product in the desired location, orientation, and scale in the camera image. The desired location, for example, corresponds to the location, orientation, and scale in the user's surroundings where the user 101 wishes to place an actual product corresponding to the augmented product. If the camera image includes a desk in the user's office, for example—and the augmented product is of a chair that the user 101 is interested in purchasing—the user 101 may move the user device 110 (and hence the associated camera 117) so as to position the augmented chair near the desk, i.e., the desired location being near the desk.

In certain example embodiments, in addition to moving the user device 110 to position the augmented product, the user may drag the augmented product to a specific location within the camera image, such as on the top, bottom, left, right, or center of the camera image. For example, the user 101 may touch the augmented product in the user device display 113, and, via a capacitive touch functionality of the user device, reposition the augmented product within the camera image. If the augmented product is an image of a chair, for example, the user may drag the augmented product around in the camera image to a desired location.

In certain example embodiments, the user additionally or alternatively provides input to change the orientation of the augmented product in the AR image. In one example, the user 101 flips the augmented product on a horizontal or vertical axis. For example, the user input may rotate the orientation of a chair in a direction determined based on user input. In certain example embodiments, the user additionally or alternatively provides input to change the scale of the augmented product in the AR image. For example, user input can shrink or enlarge the augmented product relative to real objects in the camera image.

In block 215, the product recommendation system 120 determines a viewpoint for a product recommendation image. That is, the product recommendation system 120 determines the time instant during the use of the AR application 115, for example, when an augmented product is likely to be at a position at which the user would use the product. In one example, this involves assessing user interactions to determine when the user 101 has settled on a position for the augmented product. For example, lack of changes to the camera image and/or augmented product position for a threshold period of time can be used as an indication of the user having settled on the current position of the augmented product. The details of block 215 are described in further detail below with reference to FIG. 3.

Figure 3:
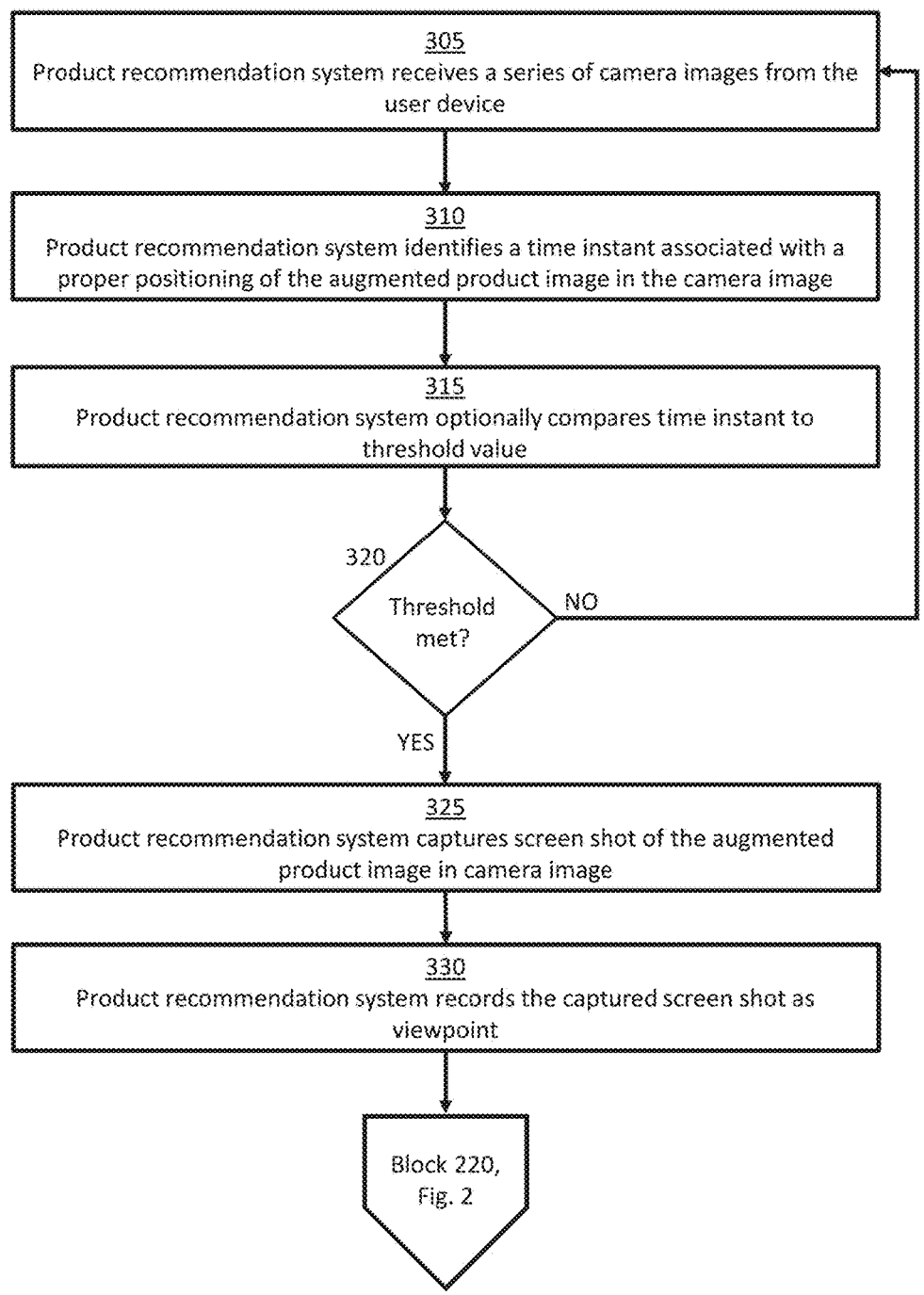
FIG. 3 is a block flow diagram depicting a method for determining a viewpoint for a product recommendation, in accordance with certain example embodiments.

FIG. 3 is a block flow diagram depicting a method 215 for determining a viewpoint for a product recommendation, in accordance with certain example embodiments. In block 305 of FIG. 3, product recommendation system 120 receives a series of camera images from the user device 110. That is, as the user 101 positions the augmented product within the camera frame, the product recommendation system 120 receives, via the network 105, a streaming video feed, for example—and any associated data—showing the user 101 placing the augmented product in the desired location and orientation in the camera image. The received data, for example, may include coordinate data of the user device 110 in space, such as the angles and directions the user 101 moves the user device. The coordinate data may also include information about the user 101 repositioning the augmented product on the screen via a capacitive touch interaction. In certain example embodiments, the images are received as streaming video throughout the user's application session using the AR application 115.

As an example, if the augmented product is a chair, and the user 101 is positioning the chair image near a desk using the camera 117 and the AR application 115, the product recommendation system 120 may receive a series of images (i.e., a video stream), such as from when the user 101 first started positioning the chair image in the camera image to the time when the user has positioned the chair image in the desired location. Hence, the received images may include a continues set of augmented reality images in which the chair was incorrectly covering the desk initially to when the user 101 placed the chair in the desired location near the desk.

In block 310, the product recommendation identifies a time instant associated with a proper positioning of the augmented product in the camera image. That is, the product recommendation system 120 reads the received images and/or any received data, such as via the image processing module 121, to determine when and how long the user moved the user device 110. If the user 101 has positioned the augmented product by touching and dragging the image via a capacitive touch interaction, the product recommendation system 110 may determine when the user 101 stopped moving the image and hence placed the augmented product in a fixed location and orientation in the camera image. The point in time when the user 101 significantly reduces movement of the user device 110 and/or the augmented product corresponds to the time instant. Hence, the time instance corresponds to the time when the user 101 has presumably positioned the augmented product in the desired location in the camera image.

To better ensure that the user 101 has in fact positioned the augmented product in the desired location in the camera image, in certain example embodiments the product recommendation system 120 determines the time instant as a length of time. That is, the product recommendation system 120 determines from the received images and/or associated data the length of time the user device 110 and/or the augmented product were held in roughly in the same position in space (i.e., the user 101 significantly reduced movement the user device 110 and/or the augmented product). Without wishing to be bound by any particular theory, it is believed that the longer the time the user does not move the user device 110 and/or reposition augmented product in the camera image, the more likely it is that the user has properly positioned the augmented product in the desired location of the camera image. For example, the product recommendation system 120 may determine that, after first moving the user device 110 and/or augmented product around erratically, the user 101 then held the user device 110 and/or the augmented product in the same place for about 0.2, 0.3, 0.4, 0.5, 0.5. 0.6, 0.7, 0.8, 0.9 1.0, 1.1, 1.2, 1.3, 1.4, 1.5, 1.6, 1.7, 1.8, 1.9, 2.0, 2.5, 3.0, 3.5 or more seconds.

In block 315, the product recommendation system 120 optionally compares the time instant to threshold value. That is, when the time instant is determined as a length of time the user 101 held the user device 110 and/or the augmented product relatively still and in place, the image processing module 121 of the product recommendation system 120 compares the determined length of time to a threshold time value. For example, if the image processing module 121 of the product recommendation system 120 determines that the user 101 held the user device 110 and/or the augmented product relatively still for 1.0 second, the image processing module 121 compares the 1.0 second to a threshold value. The threshold time value, for example, can be any length of time, such as about 0.2, 0.3, 0.4, 0.5, 0.5. 0.6, 0.7, 0.8, 0.9 1.0, 1.1, 1.2, 1.3, 1.4, 1.5, 1.6, 1.7, 1.8, 1.9, 2.0, 2.5, 3.0, 3.5 or more seconds.

In certain example embodiments, the threshold time can be chosen by an operator of the product recommendation system 120. For example, the operator may configure the threshold time via the communication application 122 and web-browser 123 to be longer when the operator desires a more precise determination that the user 101 has ceased moving the user device 110 and/or the augmented product. Such longer threshold times, for example, may be useful when the received images are outdoor images and hence the outdoor setting may include wind, rain, or other elements that affect the user's ability to hold the user device 110 and/or the augmented product still. Conversely, a shorter threshold time may be preferred when the user 101 is indoors. In certain example embodiments, the user 101 may configure the threshold time, such as via the AR application 115.

If the product recommendation system 120 determines that the time instant—when measured as the length of time the user 101 reduces movement of the user device 110 and/or the augmented product—exceeds the threshold time, the method follows from block 315 through the "YES" branch of block 320 to block 325. For example, if the time instant is 1 second and the threshold is 0.5 seconds, the threshold is met and the method proceeds to block 325 of FIG. 3. If the product recommendation system 120 determines that the threshold time is not met, the method follows from block 315 through the "NO" branch of block 320 back to block 305. That is, if the threshold is not met, the product recommendation system 120 continues to receive images from the user device 110 and, from those images, attempts to identify a time instant that exceeds the threshold.

In block 325, the product recommendation system 120, such a via the image processing module 121, captures a screen shot of the augmented product in the camera image. That is, the product recommendation system 120 obtains the screen image of the user device display 113 during the time instant, i.e., when the user 101 has positioned the user device 110 and/or the augmented product in the desired location. For example, if a 1.0 second time instant exceeds a 0.5 second threshold, the product recommendation system 120 selects a time during the 1.0 second period to capture the image depicted on the screen of the user device display 113. If the augmented product is of a chair, the captured screen shot during the 1.0 second during the 1.0 second, for example, would show the image of the chair positioned in the desired location of the camera image. In certain example embodiments, and as noted elsewhere herein, the AR application 115 on the user device 110 may perform one or more functions of the product recommendation system 120, such as determining the viewpoint and/or capturing the screenshot for the viewpoint.

In block 330, the product recommendation system 120 records the captured screen shot as the viewpoint. That is, the product recommendation system 120 determines that the screen shot captured during the time instant is the viewpoint of the user to be used in the product recommendation. The product recommendation system 120 then records the viewpoint, for example, in the data storage unit 124 of the product recommendation system 120. In embodiments where the AR application 115 performs one or more of the functions of the product recommendation system 120, such as capturing the screenshot during the time instant, the screenshot may be recorded in the data storage unit of the user device 116.

Returning to FIG. 2, in block 220 of FIG. 2, the product recommendation system determines the location and orientation of the augmented product in the viewpoint. That is, the product recommendation system 120 determines, such as via the image processing module 121, the position in which the user 101 placed the augmented product within the camera image of the viewpoint. For example, if the augmented product is a chair, and the user 101 has positioned the chair near a desk, the viewpoint will show the chair image positioned by the desk in the desired location of the user 101. Based on this desired location, the product recommendation system 120, such as via the image processing module 121, determines the location and orientation of the augmented chair, such as the direction, angle, and/or coordinates of the augmented chair in the viewpoint. As discussed herein, this augmented product position corresponds to the user's desired location of the product depicted in the augmented product of the viewpoint. Hence, the position of the augmented product can serve as a basis for placing similar product images such as candidate product images.

The location and orientation of the augmented product in the viewpoint can be determined by various techniques. For example, the AR application 115 can capture the coordinates of the camera 117 of the user device 110 throughout the user's application session. The AR application 115 can then can store, in the data storage unit of 116 of the user device 110, the location and orientation only at the time point when the viewpoint is selected, thus providing a deterministic solution to identifying the location and orientation of the augmented product. In embodiments where the product recommendation system 120 functions at least in part separately from the AR application 115, the AR application 115 can then send the stored information to the product recommendation system 120 via the network 105.

In certain example embodiments, the location, orientation, and/or scale of the augmented product can be determined using example images of objects of the same type with known locations and/or orientations. For example, the product recommendation system 120 may use a set of training images that contain images of objects, with each of the object images positioned in multiple different ways. The product recommendation system 120 can create a model or otherwise learn from the training images. For examples, it can determine features of an image of a chair that indicate the chair being in a particular orientation. The product recommendation system 120 may create a different model for different types of products, e.g., one model for chairs, one model for tables, one model for desks, etc. As a specific example, if the augmented product is a particular chair, the class of training images can include images of chairs on a monochromatic background where the chairs are in different orientations.

One exemplary technique determines the location, orientation, and/or scale of the augmented product using correlation filters. The correlation filters identify features of a training image that correspond to different locations and/or orientations. The augmented image is compared with the correlation filters to identified the augmented image's likely location, orientation, and/or scale based on similarity with the correlation filters. In one example, this involves minimizing the average Mean Square Error (MSE) between the cross-correlation output (augmented image to filter) and the ideal desired correlation output. For example, for N training images, a correlation filter design problem is posed as an optimization problem, $$\min_{f} \frac{1}{N} \sum_{i=1}^{N} \|x_i \otimes f - g_i\|_2^2 + \lambda \|f\|_2^2 \qquad (1)$$

where $\otimes$ denotes the convolution operation, $x_i$ denotes the i-th image, f is the correlation filter template, $g_i$ is the desired correlation output for the i-th image and $\lambda$ is the regularization parameter. The main idea is to control the shape of the cross-correlation output between the image and the filter. If is a spatial-frequency array (an equivalent of correlation filter template in the image domain). The main idea is to control the shape of the cross-correlation output between the image and the filter. Solving the above optimization problem results in the following closed form expression for the correlation filter, $$\hat{f} = \left[\lambda I + \frac{1}{N}\sum_{i=1}^{N} \hat{X}_i^* \hat{X}_i\right]^{-1} \left[\frac{1}{N}\sum_{i=1}^{N} \hat{X}_i^* \hat{g}_i\right] \qquad (2)$$

where $\hat{x}_i$ denotes the Fourier transform of $x_i$ and $\hat{X}_i$ denotes the diagonal matrix whose diagonal entries are the elements of $\hat{x}_i$ and * denotes conjugate transpose and I is the identity matrix of appropriate dimensions. By using the correlating filter method, the product recommendation system 120 can determine the approximate pose of the 3D object in a 2D image, such as the 2D viewpoint image.

In block 225, after determining the location and orientation of the augmented product in the viewpoint, the product recommendation system 120 determines the style similarity of the augmented product to candidate products. That is, the product recommendation system 120, such as via the image processing module 121, compares the look and design of the augmented product to the look and design of one or more candidate products. For example, if the augmented product is a chair with arms, legs, and an arched back, the product recommendation system 120 compares such features to candidate product chairs.

A set of candidate products, for example, may be stored in a repository of candidate products, such as on the data storage unit 124 of the product recommendation system 120. In certain example embodiments, an operator of the product recommendation system 120 may use the web browser 123 of the product recommendation system 120 to search for candidate products that can be used as described herein. In other example embodiments, the image processing module 121 may, such as via a web crawling module (not shown) of the communication application 122 of the product recommendation system 120, search the web for candidate products.

As those skilled in the art will appreciate based on this disclosure, a variety of methods may be used to compare the similarity of the augmented product to candidate product images. For example, in a qualitative approach, one or more operators of the product recommendation system 120 may compare the augmented product to one or more of the candidate product images by looking at the images. Additionally, or alternatively, survey data may be used to determine the similarities between the augmented product and the candidate product images. Hence, the determination of the style similarity can be determined based on individual opinions, either individually or combined together.

Figure 9B:
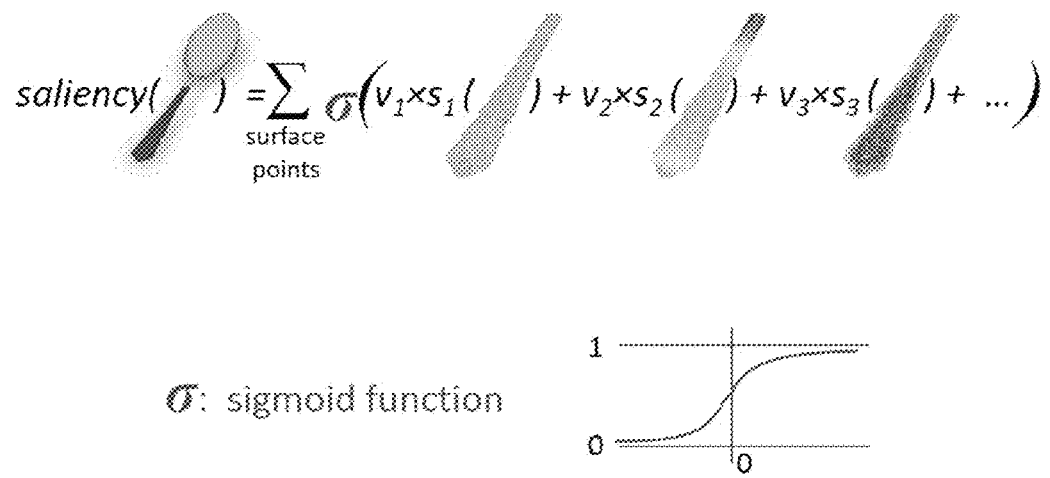
FIG. 9B is an illustration depicting a method to determine the saliency of a component as a weighted combination of geometric features like surface curvature, ambient occlusion, and other features. The weighted combination is finally scaled through a sigmoid function, in accordance with certain example embodiments.

In certain example embodiments, the product recommendation system 120 may determine style similarity using style similarity metrics. See Zhaoliang Lun et al., *Elements of Style: Learning Perceptual Shape Style Similarity*, ACM Transactions on Graphics (Proc. ACM SIGGRAPH 2015), which is expressly incorporated herein in its entirety. For example, style similarity between two products—such as the augmented product and the candidate product—can be determined based on the level of matching between three-dimensional product renderings of the products and the prevalence of the similar areas (see FIG. 9A-9C). Given an input pair of products, the product recommendation system 120, such as via the image processing module 121, can determine a distance measure that quantifies the style dissimilarity between the given products. The measure is computed via a two-step process. Given the input pair of products, the product recommendation system 120 first identifies matching elements on the pair. In the subsequent examples where the input pair is a spoon and a knife, for example, the matching elements could be the handles or the fine strips colored in blue (FIG. 9A). The product recommendation system 120 then determines the style dissimilarity, or distance, of all pairs of matching elements by considering geometric features related to element shapes, proportions, lines, etc.

But not all pairs of matching elements are equally important. Thus, in certain example embodiments, the product recommendation system 120 weights their distances according to element saliency—a quality by which a component stands out relative to its neighbors—which is also formulated as a weighted combination of geometric features including surface curvature, exposure to ambient lighting, and so on, measured over all surface points. The resulting sum is non-linearly scaled through a sigmoid function, illustrated in FIG. 9B.

Figure 9C:
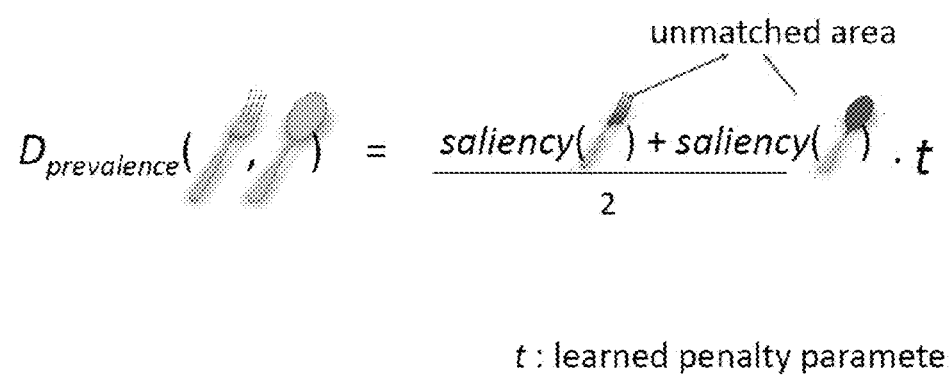
FIG. 9C is an illustration depicting a method to penalize unmatched components in a couple of 3D objects by considering their saliency, in accordance with certain example embodiments.

After summing up the resulting distances between all pairs of elements, the product recommendation system 120 can add another term measuring the element prevalence (FIG. 9C). The term penalizes the area in the two shapes that was not covered by any matching elements. The product recommendation system 120 measures the percentage of the area on both models not covered by any matched elements, weighted by their saliency. The unmatched area is penalized with a penalty parameter (FIG. 9C).

All the parameters of the style measure, including the weights used in the element similarity term, the weights of the element saliency term, and the penalty parameter of the prevalence term, can be learned from the crowd-sourced training data derived from a large scale Amazon Mechanical Turk study. Hence, the product recommendation system 120, such via the image processing module 121, can determine the dissimilarity between any pair of shapes. The product recommendation system 120 can, for example, use this determination for every candidate product image to calculate its style dissimilarity with the augmented product.

For the $i^{th}$ candidate, if $d_i$ is its distance from the starting model, then the technique associates a normalized score $\alpha_1$ denoting its style similarity on a scale of 0-1 as follows:

$$\alpha_i = \frac{1}{1 + d_i} \tag{3}$$

Hence, style similarity metrics can be used to determine a style similarly score when comparing the augmented product and the candidate product. For example, a comparison of chairs having arms that are continuous with the base and back of the chairs may have a style similarity score closer to 1.0, such as from about 0.7 to about 1.0. In contrast, two less similar chairs, such as a lounge chair having arms that are continuous with the base and back and an office-type chair with wheels, will have a lower similarity score, such as a score between 0.3 to 0.6, such as about 0.4. An example of determining a style similarity score is provided in Example 1, below.

In block 230, the product recommendation system 120 creates a set of recommendation images based on style similarity. That is, based on the determined similarity of the augmented product to one or more candidate products, the product recommendation system 120, such as via the image processing module 121, creates a set of images in which a candidate product image of a candidate product is substituted for the augmented product in the viewpoint. For example, the product recommendation system 120 retrieves a copy of the viewpoint from the data storage unit 124, removes the image of the augmented product from the viewpoint, and embeds the candidate product image in the viewpoint in place of the augmented product.

When embedding the candidate product image in the viewpoint, for example, the product recommendation system 120 places the image in a similar orientation and location as the augmented product that was previously in the viewpoint. For example, the candidate product may have a different orientation than the augmented product. Hence, in certain example embodiments, the product recommendation system 120 uses the determined location, orientation, and/or scale of the augmented product to embed the candidate product image within the viewpoint. For example, the product recommendation system 120 can reorient the candidate product so as to match or approximate the orientation of the augmented product. In certain example embodiments, the product recommendation system 120 may embed the candidate product image in the camera image within which the user placed the augmented product. For example, the product recommendation system 120 uses the determined location and orientation of the augmented product in the viewpoint to position the image of candidate product in camera image, the camera image corresponding to the background of the viewpoint.

In certain example embodiments, the recommendation images may be normalized such that they have the same reference in terms of the rotation, translation, and scale. For example, known applications and image enhancement programs can be used to normalize the location/orientation/scale of the candidate product in the camera image. Hence, when substituting the augmented product with the candidate product images in a given set of recommendation images, the same coordinates (location and scale) can be used— among the set of recommendation images—to embed different candidate product images. An example of embedding candidate product images in the viewpoint to create a recommendation image is provided in Example 2, below.

In block 235 of FIG. 2, the product recommendation system 120 evaluates the recommendation images to select one or more recommendation images to provide to the user 101. That is, the product recommendation system 120, such as via the image processing module 121, determines which recommendation images among the set of created recommendation images should be provided to the user 101 as a product recommendation. Recommendation images may be selected, for example, based on color compatibility. The details of block 235 are described further below with reference to FIG. 4.

Figure 4:
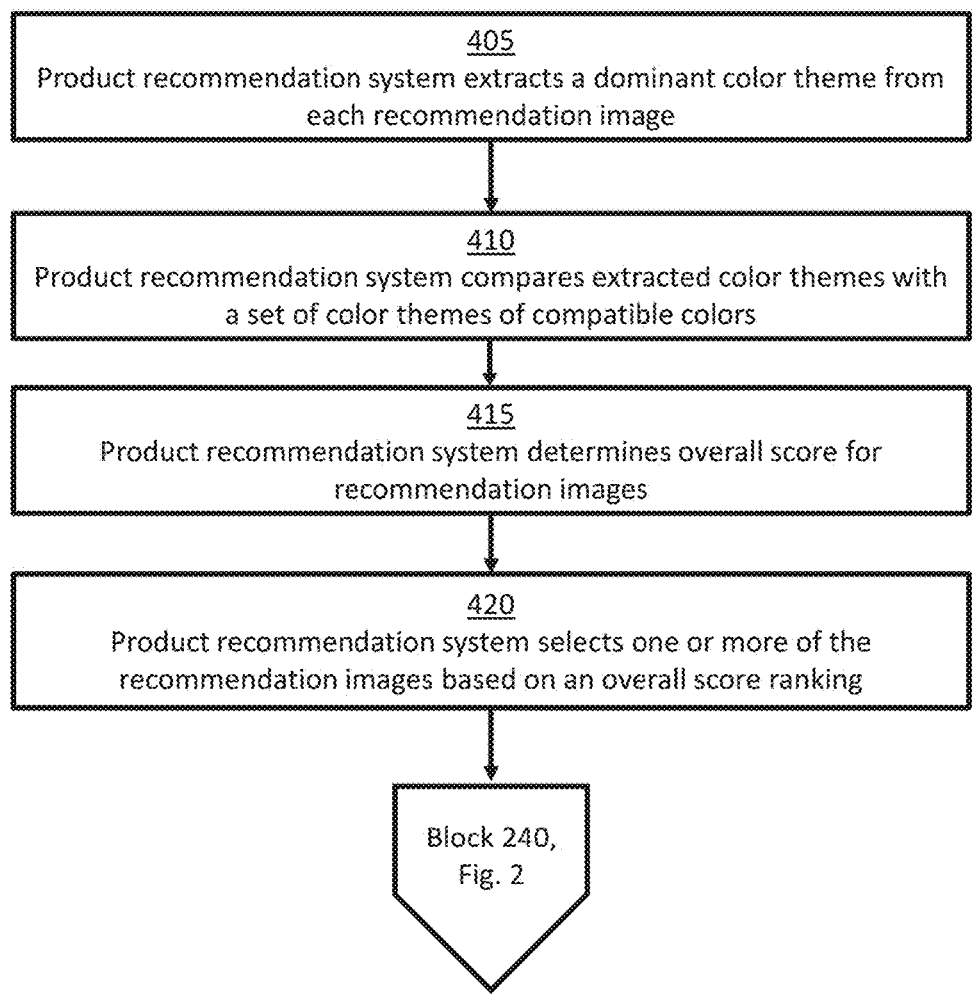
FIG. 4 is a block flow diagram depicting a method for evaluating recommendation images, in accordance with certain example embodiments.

FIG. 4 is a block flow diagram depicting a method for evaluating recommendation images, in accordance with certain example embodiments. In block 405 of FIG. 4, the product recommendation system 120 extracts a dominant color theme from each recommendation image. That is, the product recommendation system 120 determines the color scheme within each recommendation image. For example, the product recommendation system 120 determines a set of dominant colors that may attract the attention of a user 191. As those skilled in the art will appreciate, certain hues or hue templates may be preferred by users 101 while viewing the candidate product image and thus influence the user's 101 aesthetic preferences. As such, incorporating color compatibility of the candidate product image with respect to its background is advantageous.

In block 410, the product recommendation system 120 compares the extracted color themes with a set of color themes of compatible colors to determine color compatibility. That is, for each of the recommendation images, the product recommendation system 120 evaluates whether the extracted color theme is acceptable in view of color themes that are determined have compatible colors. In certain example embodiments, an operator, such as an operator of the product recommendation system 120 compares the extracted color them of known color themes to determine, qualitatively, whether the color theme in a given recommendation image is aesthetically pleasing.

Alternatively, whether the extracted color theme has compatible colors is determined in view of known compatible color themes quantitatively. For example, the product recommendation system 120, such as via the image processing module 121, determines a color compatibility score for the recommendation image. In certain example embodiments, to determine the color compatibility score, the product recommendation system 120 can use a quantitative model that rates the quality of a color theme of an image. For example, the product recommendation system 120 may extract a set of five dominant colors in a recommendation image and then assesses the compatibility of the color theme. Since one or more of the colors in the extracted color theme is from the candidate product image, this technique determines color compatibility of the candidate product image with the background real objects in the viewpoint.

In certain example embodiments, the product recommendation system 120 may rely on the following model, which attempts to represent or suggest each recommendation image by a set of five colors:

$$\max_t \alpha \bullet r(t) - \frac{1}{N}\sum_i \min_{1 \le k \le 5}(\max(\|c_i - t_k\|_2, \sigma)) - \frac{\tau}{M}\max_k \sum_{j \in N(t_k)} \max(\|c_j - t_k\|_2, \sigma) \quad (4)$$

Equation 4 above identifies the set of 5 dominant colors as a theme, where r(t) is the rating of theme t (ratings as ground truth are obtained by MTurk Study where people rated different themes of 5 colors given an image), $c_i$ is a pixel color, $t_k$ a theme color, N is the number of pixels, σ is the threshold for distance allowed and α and τ are the learning rate parameters. The first term measures the quality of the extracted theme. The second term penalizes dissimilarity between each image pixel $c_i$ and the most similar color $t_k$ in the theme. The norm is used as the color may not be exactly same. The product recommendation system 120 is configured to look for the closest color. The third term penalizes dissimilarity between theme colors $t_k$ and the M most similar image pixels N(t), to prevent theme colors from drifting from the image. Constants are taken based on empirical observations. Then each theme of five colors is scored using a regression model. The theme of five colors is used to create a vector of 326 features y(t). Feature selection is performed to determine the most relevant features.

Given the ground truth ratings from MTurk study and 5 color theme converted into 326 features y(t), a regression model is learned to obtain the ratings for any new image. Two models can be used. One is linear denoted by equation (5):

$$r(t) = w^T y(t) + b \quad (5)$$

The second is LASSO regression which is a linear function of the features with penalty on the magnitude of weights:

$$\min_{w,b} \sum_i (w^T y_i + b - r_i)^2 + \lambda\|w\|_1 \quad (6)$$

Here, r(t) is the predicted rating of the input theme, and w, b are the learned parameters.

Both the equations 5 and 6 provide weights which can be used to obtain ratings of any new recommendation image. For each embedded image corresponding to a candidate product image, the product recommendation system 120, such as via the image processing model 121, can extract a theme and pass it through this regression model. For the $i^{th}$ candidate, if $t_i$ is the extracted theme, then the product recommendation system 120 can associate a normalized score $\beta_i$ denoting its color compatibility with the viewpoint on a scale of 0-1, as follows:

$$\beta_i = \frac{r(t_i) - 1}{5 - 1} \quad (7)$$

As the users' rating ranged from 1 to 5, therefore $\beta i = (r(t_i) - 1)/(5-1)$. That is, $(r(t_i) - \min(r))/(\max(r) - \min(r))$.

In block 415, when the product recommendation system 120 relies on quantitative evaluation of the recommendations images, the product recommendation system 120 determines an overall score for the recommendation images. That is, the product recommendation system 120 relies on a combination of the style seminary score and the color compatibility score to determine an overall score by which to judge the set of recommendation images. For example, after devising two normalized scores associated with each possible recommendation as, α—denoting its style similarity to the augmented product, and β—denoting its color compatibility with the user's viewpoint.

The product recommendation system 120, such as via the image processing module 121, then determines an overall score $\gamma_i$ associated with the $i^{th}$ candidate, assuming it to be a linear combination of the above two scores, i.e., $$\gamma_i = w_1\alpha_i + w_2\beta_i \qquad (8)$$

To determine the weights $w_1$ and $w_2$, the product recommendation system 120 can use the Rank-SVM algorithm that employs pair-wise ranking methods. The input to this algorithm is ground truth ranking of the objects having certain scores, and it determines the weights corresponding to each of the score denoting their importance in ranking. An example of determining weights $w_1$ and $w_2$ is provided in Example 3, below.

In block 420, the product recommendation system 120 selects one or more of the recommendation images based on an overall score ranking. That is, the product recommendation system 120, such as via the image processing module 121, ranks all of the product recommendation images according to the determined overall score. The product recommendation system 120 then determines which among the set of recommendation images have the highest overall score by examining the ranking. A system operator, such as an operator of the product recommendation system 120, can configure the product recommendation system 120 to select a given number of the ranked product recommendation images. For example, if 50 product recommendation images are produced, the system operator may, such as via the communication application 122, access the product recommendation system 120 and configure the product recommendation system 120 to select the top 5 or 10 images for providing to the user 101. In certain example embodiments, the product recommendation system 120 may be configured to only select the single, highest-ranked recommendation image.

Returning to FIG. 2, in block 240, the product recommendation system 120 provides a product recommendation to the user 101. That is, in certain example embodiments, the product recommendation system 120 transmits the rank-selected product recommendation images to a user device 110 of the user 101 via the network. For example, the recommendation images may be provided to the user 101 via email, text message, push notification, or any other form of communication. The user device 110 then receives the recommendation images and presents the recommendation images to the user 101 as a product recommendation, such as on the display on the user device 110.

As those skilled in the art will appreciate, the selected recommendation images can be presented to the user 101 in a variety of ways for viewing. For example, the AR application 115 may present the selected and received recommendation images directly to the user 101 via the user device display 113 of the user device 110. If five recommendation images are transmitted to the user device 110 and presented directly to the user 101, for example, the user 101 may swipe through the five images, thereby viewing each image on the device display 113 of the user device 110. Additionally or alternatively, the product recommendation system 120 may, via the communications application 122, upload the selected recommendation images to a website such that the user 101 can log in to the website and view recommendation images. Additionally or alternatively, the AR application 115 on the user device 110 may present one or more of the selected recommendation images to the user 101 when the user is searching online, such as in response to a product search.

In certain example embodiments, the selected recommendation images may be accompanied with an offer of the product depicted in the candidate image. For example, the marketing apparatus 130 may provide text, images, or other data/information that can be provided along with a recommendation image, such as to advertise to further advertise the product identified in the candidate product image of the recommendation image. If the recommendation image includes a table as the candidate product image, for example, the marketing apparatus 130 may provide a banner stating "33% off all tables at John Doe's furniture outlet!" that the product recommendation system 120 and/or the AR application 115 can associate with the recommendation image before the recommendation image is presented to the user 101.

In certain example embodiments, the marketing apparatus 130 may associate data tags/cookies with one or more of the recommendation images so that the recommendation image can be presented to the user 101 at a specific time, such as when the user 101 searches for the product. For example, the marketing apparatus 130 may, in conjunction with the product recommendation image 120 and/or the AR application 115, rely on data tags/cookies to trigger the display of a particular recommendation image showing a table in response to the user 101 searching the web for a table.

In certain example embodiments, the user 101 may receive the selected recommendation images in a catalog, such a paper of digital catalog. For example, rather than transmitting the recommendation images to the user 101 via the network, the product recommendation system 120 may provide the selected recommendation images to the marketing apparatus 130, which compiles the recommendation in a catalog that is sent to the user 101, either as a paper catalog through common mail routs or electronically such as with an emailed product catalog. Where the user 101, for example, has used the methods and systems described herein to create several viewpoints with different products, the catalog may include recommendation images of different rooms of the user's house, thereby making multiple product recommendations to the user 101 based on the user's actual surroundings.

In certain example embodiments, before the recommendation images are presented to the user 101, the images are enhanced. The recommendation images can be manipulated in a variety of ways. For example, the product recommendation system 120, such as via the image processing module 121, may adjust the color, hue, brightness, shading, contrast, or other features of the recommendation image. In certain circumstances, for example, the user device 110 might not have a quality camera or the viewpoint can include irrelevant background. The final images in the catalogues, for example, can thus be enhanced by contrasting, sharpening, and cropping out irrelevant background images. For example, the product recommendation system 120 can manipulate the contrast of the image so as to make the candidate product image distinguishable with respect to other real objects in the received user viewpoint. For example, the user's dog may inadvertently enter the field of the camera 117 when the viewpoint is captured, in which case the dog may be cropped out of the viewpoint. Additionally or alternatively, the product recommendation system 120 may sharpen the candidate product image for emphasizing texture and drawing the user's focus. Sharpening may be needed, for example, when camera 117 lenses blur an image to some degree.

Figure 5A:
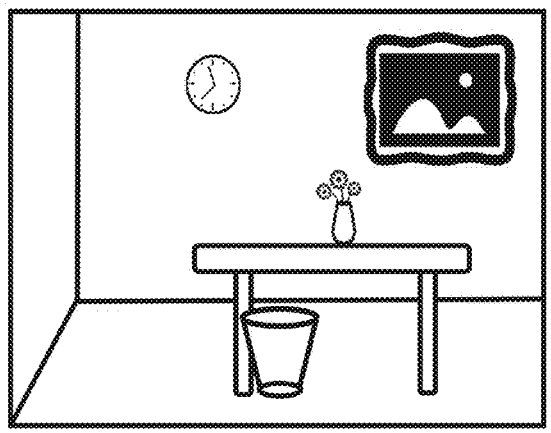
FIG. 5A is an illustration depicting a camera image, in accordance with certain example embodiments.
Figure 5B:
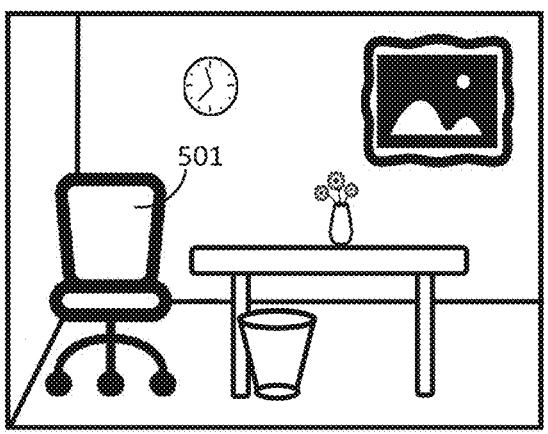
FIG. 5B is an illustration depicting a viewpoint, in accordance with certain example embodiments.
Figure 5C:
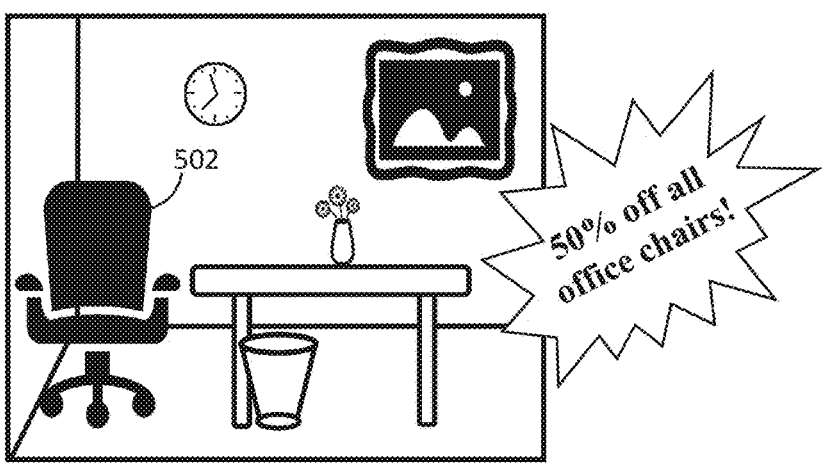
FIG. 5C is an illustration depicting a recommendation image with an associated product offer, in accordance with certain example embodiments.

FIGS. 5A-5C represent a series of images that arise during the creation of a recommendation image, in accordance with certain example embodiments. More particularly, FIG. 5A is an illustration depicting a camera image, in accordance with certain example embodiments. For example, the camera image is created when the user 101 points the camera 117 of the user device 110 at the user's surroundings, such as towards a room of the user's office. In the example camera image of FIG. 5A, the depicted room includes various real objects, such as a desk, trashcan, clock, and wall art. The image of the room and the real objects contained therein appear on the user device display 113 of the user device 110 when the user 101 points the camera 117 of the user device 110 at the user's office.

FIG. 5B is an illustration depicting a viewpoint, in accordance with certain example embodiments. As compared to FIG. 5A, shown is an augmented product 501, i.e., an image of an office chair, that the user 101 has selected and inserted into the camera image according to the methods described in blocks 205-215 of FIG. 2. When the user 101 positions the augmented chair 501 in the desired location, the image on the user device display 113 is captured as the viewpoint (FIG. 5B). As shown, the user 101 has positioned the augmented product 501 of the chair beside the desk, with the chair facing outwards towards to the user 101 from the user device display 113 of the user device 110 in the viewpoint image. The augmented product 501 of the chair is thus positioned among the camera image of real objects in the user's surroundings, i.e., among the images of the desk, trashcan, clock, and wall art.

FIG. 5C is an illustration depicting a recommendation image with an associated product offer, in accordance with certain example embodiments. As shown, a candidate product image 502 of a chair that is similar to the augmented product 501 of the chair of FIG. 5B is substituted for the chair image of FIG. 5B in the viewpoint. The substitution of the augmented product 501 by the candidate product image 502 is based, for example, on the similarity of the augmented product to a candidate product, as described herein. As shown in FIG. 5C, the augmented product 501 of the chair image shown in FIG. 5B has no chair arms, but it is otherwise relatively similar to the candidate chair image shown in FIG. 5C. In the recommendation image of FIG. 5C, the candidate product image 502 is shown in the same position as the augmented product 501 from the viewpoint image of FIG. 5B, i.e., the candidate product image 502 chair image is facing outwards towards to the user 101 from the user device display 113 of the user device 110. As a recommendation image, the image shown in FIG. 5C can be provided to a user 101 as described herein. As shown, and in accordance with certain example embodiments described herein, the recommendation image may be associated with an offer, such as the "50% off office chairs!" flash banner offer shown in FIG. 5C.

Example Computing Environment

Figure 6:
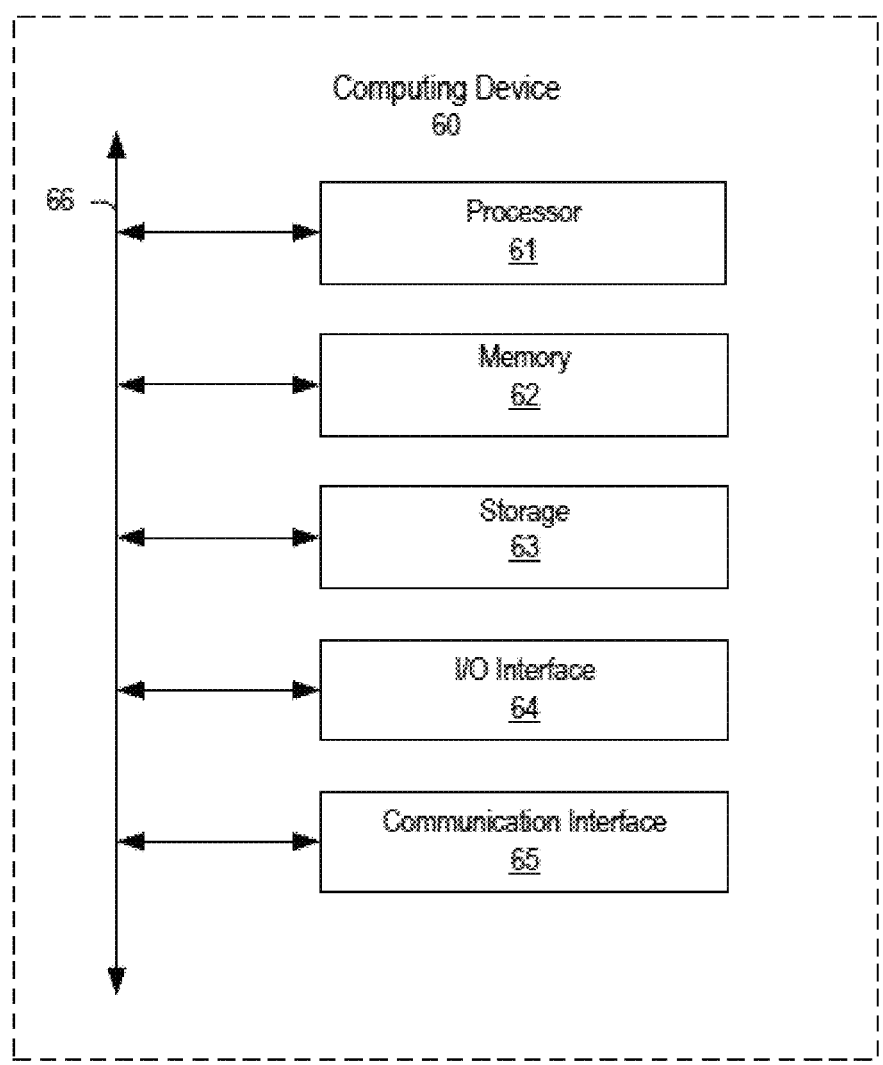
FIG. 6 is a block diagram depicting an example hardware implementation, in accordance with certain example embodiments.

Any suitable computing system or group of computing systems can be used to implement the techniques and methods disclosed herein. For example, FIG. 6 is a block diagram depicting examples of implementations of such components. The computing device 60 can include a processor 61 that is communicatively coupled to a memory 62 and that executes computer-executable program code and/or accesses information stored in memory 62 or storage 63. The processor 61 may comprise a microprocessor, an application-specific integrated circuit ("ASIC"), a state machine, or other processing device. The processor 61 can include one processing device or more than one processing device. Such a processor can include or may be in communication with a computer-readable medium storing instructions that, when executed by the processor 61, cause the processor to perform the operations described herein.

The memory 62 and storage 63 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing device 60 may also comprise a number of external or internal devices such as input or output devices. For example, the computing device is shown with an input/output ("I/O") interface 64 that can receive input from input devices or provide output to output devices. A communication interface 65 may also be included in the computing device 60 and can include any device or group of devices suitable for establishing a wired or wireless data connection to one or more data networks. Non-limiting examples of the communication interface 65 include an Ethernet network adapter, a modem, and/or the like. The computing device 60 can transmit messages as electronic or optical signals via the communication interface 65. A bus 66 can also be included to communicatively couple one or more components of the computing device 60.

The computing device 60 can execute program code that configures the processor 61 to perform one or more of the operations described above. The program code can include one or more modules. The program code may be resident in the memory 62, storage 63, or any suitable computer-readable medium and may be executed by the processor 61 or any other suitable processor. In some embodiments, modules can be resident in the memory 62. In additional or alternative embodiments, one or more modules can be resident in a memory that is accessible via a data network, such as a memory accessible to a cloud service.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

EXAMPLES

The following examples are offered to illustrate, but not to limit the claimed invention. It is understood that the examples and embodiments described herein are for illustrative purposes only and that various modifications or changes in light thereof will be suggested to persons skilled in the art and are to be included within the spirit and purview of this application and scope of the appended claims.

Example 1—Determination of Style Similarity Score

Figure 7A:
FIG. 7A is an image depicting similarity between two product models in the same class, in accordance with certain example embodiments.

Using style similarity metrics as described herein at block 225 (and Equation 3), a style similarity score was determined between a product pair. More particularly, the three-dimensional features of a chair having arms that are continuous with the base and back of the chair was compared to a candidate product (FIG. 7A). As shown in FIG. 7A, one chair (the blue chair) has four, post-style legs while the other chair (orange chair) has tubing-type legs. Both chairs also have arms that are continuous with the base and back of the chair (FIG. 7A). Using the style similarity metrics as described herein at block 225 (and Equation 3), the style similarity score for the chairs depicted by the two images was 0.76.

Figure 7B:
FIG. 7B is an image depicting similarity between two product models in the same class, in accordance with certain example embodiments.

In another determination, comparison of two less similar chairs resulted in a lower similarity score. More particularly, the chair having arms that are continuous with the base and back of the chair (orange chair, FIG. 7B) was compared to an office-style rolling desk chair (purple chair). The office-style chair does not, for example, have arms that are continuous with the base and back of the chair (FIG. 7B). The determined style similarity score was 0.46 for the comparison.

Example 2—Creation of Recommendation Images

Figure 8A:
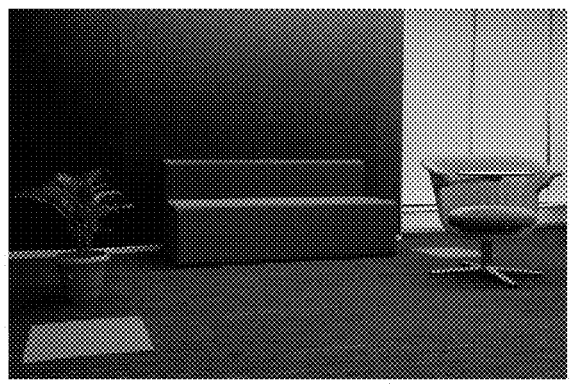
FIG. 8A is a camera image, in accordance with certain example embodiments.
Figure 8B:
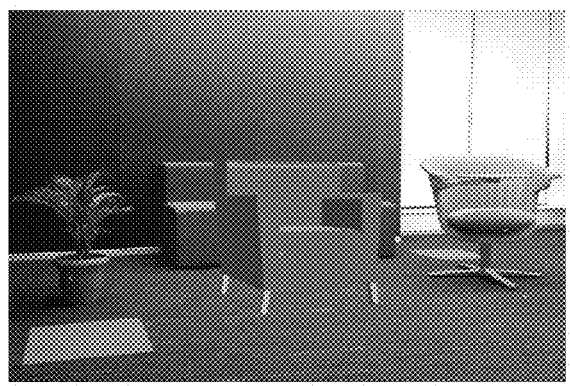
FIG. 8B is an image of a viewpoint, in accordance with certain example embodiments.
Figure 8C:
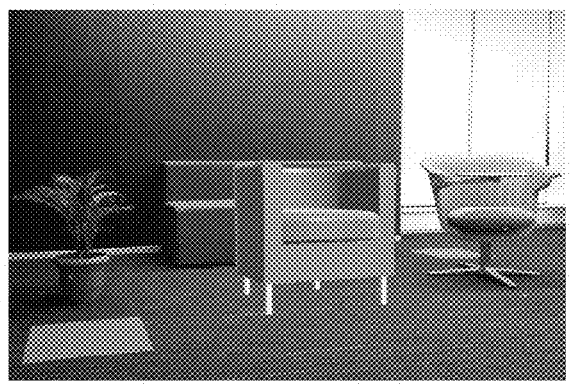
FIG. 8C is an image of a recommendation image, in accordance with certain example embodiments.
Figure 8D:
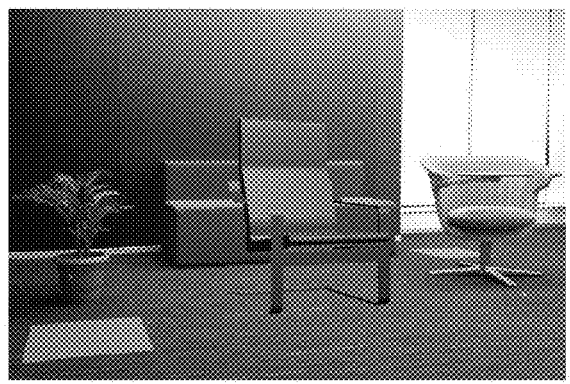
FIG. 8D is an image of a recommendation image, in accordance with certain example embodiments.

A series of recommendation images were created as described herein in block 235. Briefly, a camera image was captured via an augmented reality application. The camera image is shown in FIG. 8A. Real objects, i.e., the flower pot, sofa, and chair are positioned in the camera image. An augmented product, in this example a red chair, was inserted into the camera image, and a viewpoint was captured (FIG. 8B). FIG. 8C shows a recommendation image. That is, based on similarity between the augmented product and the candidate product, the orange chair (as the candidate product image in FIG. 8C) was substituted for the red chair of the viewpoint (compare FIG. 8C to FIG. 8B). In FIG. 8D, a different candidate product image, i.e., a less similar brown chair, is substituted for the augmented product (compare FIG. 8D to FIG. 8D). As shown, the real objects captured in the camera image (FIG. 8A) appear in all of the images.

Example 3—Determination of Weighting for Overall Score (Equation 3)

The weighting ($w_1$ and $w_2$) of Equation 3 (i.e., $\gamma_i = w_1 \alpha_i + w_2 \beta_i$) was determined in accordance with block 415 as follows. A collection of 6 lists of images with 6 unique starting products was produced, each capturing a different viewpoint. For each product, 9 candidate product images were embedded with the local orientation similar to the starting, augmented product. The scores $\alpha$, $\beta$ were then calculated for the 6*9=54 candidate recommendations with respect to their given initial products. Then a survey was conducted where, for each of the 6 lists of 9 images, participants were asked to rank the recommendations. 10 responses for each list were collected. These were ranked lists with respect to the starting models. One can use any standard approach of Rank Aggregation to get the ground truth. Here, an "average the ranks and then rank the averages" method was used to get the ground truth ranking. In this algorithm, one determines average of the rankings of the models from different participants-annotated ranked lists and then rank the averages to get the final ground truth ranking.

This algorithm was justified here, as the Kendall-Tau rank correlation (including ties) obtained among the "average ranking" and the "individual rankings" had an approximate value of 0.71, which is pretty high. This suggests that people on an average used to suggest similar ranking in this scenario.

After getting the ground truth ranking for each list by the above rank aggregation method, as a result, we had a total of $\binom{9}{2}*6=216$ pairs of model comparisons. By performing 4:1:1 split on this dataset for training, validation and testing, we rank Rank-SVM on the training data. Validation data was used to achieve an optimal cost parameter required in the rank-SVM. And the test set was used to report the accuracy of the model.

TABLE 1

Weights and Accuracy on the Validation Set

| Cost | kernel | $w_1$ | $w_2$ | Accuracy |
|---|---|---|---|---|
| 1 | linear | 0.15 | 1.56 | 61.11 |
| 1.5 | linear | 0.16 | 1.65 | 63.88 |
| 2 | linear | 0.18 | 1.69 | 66.67 |
| 2.5 | linear | 0.18 | 1.54 | 69.44 |

TABLE 1-continued

Weights and Accuracy on the Validation Set

| Cost | kernel | $w_1$ | $w_2$ | Accuracy |
|------|--------|-------|-------|----------|
| 3    | linear | 0.19  | 1.66  | 72.22    |
| 3.5  | linear | 0.21  | 1.66  | 72.22    |
| 4    | linear | 0.21  | 1.66  | 72.22    |
| 4.5  | linear | 0.21  | 1.66  | 72.22    |
| 5    | linear | 0.21  | 1.66  | 72.22    |

Finally, we determined $w_1=0.19$, and $w_2=1.66$, with cost=3, an accuracy of about 72.22% over validation set and an accuracy of 55.56% on the test set.

The magnitude of weights denotes the importance of the features in the ranking (preferences). This also indicates that color compatibility was preferred by the users over style similarity.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method for providing a product recommendation to a user using augmented reality, the method comprising:
   receiving a viewpoint of the user from an augmented reality application, wherein the viewpoint comprises a camera image of real objects and an image of an augmented product, the image of the augmented product being positioned among the real objects of the camera image in the viewpoint;
   determining a location and orientation of the augmented product in the viewpoint;
   determining style similarities of the augmented product to candidate products;
   based on the determined style similarities of the augmented product to the candidate products, creating a set of recommendation images by embedding images of the candidate products in a position that corresponds to the determined location and orientation of the augmented product in the viewpoint;
   automatically determining a recommendation image from the set of recommendation images to provide to the user based on automatically evaluating the set of recommendation images using at least one of color compatibility scoring and style similarity scoring for each recommendation image from the set of recommendation images; and
   in response to the automatically determining, providing the recommendation image to the user, thereby providing a product recommendation to the user.

2. The method of claim 1, wherein determining the location and orientation of the augmented product in the viewpoint comprises receiving a stored location and orientation of the augmented product from a user device of the user.

3. The method of claim 1, wherein determining the location and orientation of the augmented product in the viewpoint comprises applying a correlation filter technique to compare attributes of the augmented product in the viewpoint to attributes of images of objects in different known locations or different known orientations.

4. The method of claim 1, wherein automatically determining the recommendation image from the set of recommendation images comprises:
   identifying candidate products similar to the augmented product;
   creating the set of recommendation images, wherein creating the set of recommendation images comprises creating each respective recommendation image by embedding an image of a respective candidate product in the camera image;
   evaluating each of the recommendation images in the set of recommendation images; and
   automatically determining the recommendation image from the set of recommendation images based on said evaluating.

5. The method of claim 4, wherein evaluating each of the recommendation images in the set of recommendation images comprises evaluating color compatibility of colors within each recommendation image of the set of recommendation images.

6. The method of claim 5, wherein evaluating the compatibility of colors within each of the recommendation images comprises comparing a set of dominant colors in each of the recommendation images with a set of color themes of compatible colors.

7. The method of claim 4, wherein evaluating each of the recommendation images in the set of recommendation images comprises evaluating style similarity of the augmented product to the respective candidate product in each respective recommendation image.

8. The method of claim 6, wherein evaluating the style similarity of the augmented product to the respective candidate product comprises comparing matching elements at different scales between the candidate product and the respective augmented product.

9. The method of claim 4, wherein evaluating each of the recommendation images comprises:
   evaluating compatibility of colors within each respective recommendation image;
   evaluating style similarity of the augmented product to the respective candidate product in each respective recommendation image; and
   determining an overall score for each respective recommendation image based on the respective compatibility of colors and style similarity.

10. The method of claim 4, wherein providing the product recommendation to the user comprises:
    identifying top ranked recommendation images based on the overall score of each respective recommendation image; and
    providing a catalogue of the top ranked recommendation images to the user.

11. The method of claim 1, further comprising enhancing the recommendation image, wherein enhancing the recommendation image comprises:
    improving sharpness of the recommendation image;
    improving contrast of the recommendation image; or
    removing irrelevant background of the recommendation image.

12. The method of claim 1, wherein receiving the viewpoint from the augmented reality application comprises identifying a first time instant during an augmented reality session at which a user spends more time than a threshold amount of time without repositioning the augmented product among the real objects of the camera image.

13. A system for providing a product recommendation using augmented reality, the system comprising:
- at least one memory including instructions; and
- at least one processor that is operably coupled to the at least one memory and that is arranged and configured to execute instructions that, when executed, cause the at least one processor to:
  - receive a viewpoint of the user from an augmented reality application, wherein the viewpoint comprises a camera image of real objects and an image of an augmented product, the image of the augmented product being positioned among the real objects of the camera image in the viewpoint;
  - determine a location and orientation of the augmented product in the viewpoint;
  - determine style similarities of the augmented product to candidate products;
  - based on the determined style similarities of the augmented product to the candidate products, create a set of recommendation images by embedding images of the candidate products in a position that corresponds to the determined location and orientation of the augmented product in the viewpoint;
  - automatically determine a recommendation image from the set of recommendation images to provide to the user based on automatically evaluating the set of recommendation images using at least one of color compatibility scoring and style similarity scoring for each recommendation image from the set of recommendation images; and
  - in response to the automatically determining, provide the recommendation image to the user, thereby providing a product recommendation to the user.

14. The system of claim 13, wherein the instructions that cause the at least one processor to determine the location and orientation of the augmented product in the viewpoint comprise instructions that cause the at least one processor to receive a stored location and orientation of the augmented product from a user device of the user.

15. The system of claim 14, wherein the instructions that cause the at least one processor to determine the location and orientation of the augmented product in the viewpoint comprise instructions that cause the at least one processor to apply a correlation filter technique to compare attributes of the augmented product in the viewpoint to attributes of images of objects in different known locations or different known orientations.

16. The system of claim 14, wherein the instructions that cause the at least one processor to automatically determine the recommendation image from the set of recommendation images comprise instructions that cause the at least one processor to:
- identify candidate products similar to the augmented product;
- create the set of recommendation images, wherein creating the set of recommendation images comprises creating each respective recommendation image by embedding an image of a respective candidate product in the camera image;
- evaluate each of the recommendation images in the set of recommendation images; and
- automatically determine the recommendation image from the set of recommendation images based on said evaluating.

17. The system of claim 13, further comprising instructions that cause the at least one processor to enhance the recommendation image, wherein the instructions that cause the at least one processor to enhance the recommendation image comprise instructions that cause the at least one processor to:
- improve sharpness of the recommendation image;
- improve contrast of the recommendation image; or
- remove irrelevant background of the recommendation image.

18. The system of claim 13, wherein the instructions that cause the at least one processor to receive the viewpoint from the augmented reality application comprise instructions that cause the at least one processor to identify a first time instant during an augmented reality session at which a user spends more time than a threshold amount of time without repositioning the augmented product among the real objects of the camera image.

19. A computer program product for providing a product recommendation using augmented reality, the computer program product being tangibly embodied on a non-transitory computer-readable storage medium and comprising instructions that, when executed by at least one computing device, are configured to cause the at least one computing device to:
- receive a viewpoint of the user from an augmented reality application, wherein the viewpoint comprises a camera image of real objects and an image of an augmented product, the image of the augmented product being positioned among the real objects of the camera image in the viewpoint;
- determine a location and orientation of the augmented product in the viewpoint;
- determine style similarities of the augmented product to candidate products;
- based on the determined style similarities of the augmented product to the candidate products, create a set of recommendation images by embedding images of the candidate products in a position that corresponds to the determined location and orientation of the augmented product in the viewpoint;
- automatically determine a recommendation image from the set of recommendation images to provide to the user based on automatically evaluating the set of recommendation images using at least one of color compatibility scoring and style similarity scoring for each recommendation image from the set of recommendation images; and
- in response to the automatically determining, provide the recommendation image to the user, thereby providing a product recommendation to the user.

20. The computer program product of claim 19, wherein the instructions that cause the at least one computing device to determine the location and orientation of the augmented product in the viewpoint comprise instructions that cause the at least one computing device to receive a stored location and orientation of the augmented product from a user device of the user.

* * * * *